(12) United States Patent
Tanaka

(10) Patent No.: US 9,561,585 B2
(45) Date of Patent: Feb. 7, 2017

(54) ACTUATOR DEVICE, MULTI-SHAFT DRIVING DEVICE, AND ROBOT DEVICE

(75) Inventor: Akichika Tanaka, Chiba (JP)

(73) Assignee: SONY CORPORATION, Tokyo (JP)

( * ) Notice: Subject to any disclaimer, the term of this patent is extended or adjusted under 35 U.S.C. 154(b) by 87 days.

(21) Appl. No.: 14/114,647

(22) PCT Filed: Apr. 16, 2012

(86) PCT No.: PCT/JP2012/060247
§ 371 (c)(1),
(2), (4) Date: Oct. 29, 2013

(87) PCT Pub. No.: WO2012/165068
PCT Pub. Date: Dec. 6, 2012

(65) Prior Publication Data
US 2014/0060223 A1    Mar. 6, 2014

(30) Foreign Application Priority Data

Jun. 3, 2011 (JP) ................. 2011-124730

(51) Int. Cl.
| | | |
|---|---|---|
| *B25J 19/02* | (2006.01) | |
| *B25J 9/02* | (2006.01) | |
| *B25J 9/06* | (2006.01) | |
| *B25J 9/12* | (2006.01) | |
| *B25J 13/08* | (2006.01) | |

(Continued)

(52) U.S. Cl.
CPC .. *B25J 9/02* (2013.01); *B25J 9/06* (2013.01); *B25J 9/08* (2013.01); *B25J 9/126* (2013.01); *B25J 13/085* (2013.01); *F16H 21/40* (2013.01); *H02K 7/116* (2013.01); *H02K 11/215* (2016.01);

(Continued)

(58) Field of Classification Search
CPC ............... B25J 9/02; B25J 17/00; B25J 18/00; G05B 19/04; H02P 5/00; H02P 6/04; H02P 7/00
See application file for complete search history.

(56) References Cited

U.S. PATENT DOCUMENTS 6,220,104 B1 * 4/2001 Yoshino et al. ........... 73/862.08
7,122,926 B2 * 10/2006 Tesar ........................ H02K 7/10
 310/75 R (Continued)

FOREIGN PATENT DOCUMENTS

| JP | 11-123676 | 5/1999 |
|---|---|---|
| JP | 2003-278868 | 10/2003 |

(Continued)

*Primary Examiner* — Bentsu Ro
*Assistant Examiner* — Thai Dinh
(74) *Attorney, Agent, or Firm* — Oblon, McClelland, Maier & Neustadt, L.L.P.

(57) ABSTRACT

Provided is an actuator device used in a plurality of sites of a multi-shaft driving mechanism such as a multi-shaft manipulator, a robot arm, a leg structure and a snake-shaped robot. A torque sensor is connected to a bearing such as a cross roller bearing through a mount part. The torque sensor is driven by an outer ring relative to a stationary part case of an actuator device. An attachment surface of an output shaft frame is arranged in a position offset from the bearing on a side of the stationary part case. An entire length of the actuator device in an output shaft direction does not change also after the output shaft frame is attached and an occupied space does not increase.

16 Claims, 22 Drawing Sheets

(51) Int. Cl.
  *F16H 21/40* (2006.01)
  *B25J 9/08* (2006.01)
  *H02K 7/116* (2006.01)

(52) U.S. Cl.
  CPC ............ *H02K 11/24* (2016.01); *Y10S 901/23* (2013.01); *Y10T 74/18568* (2015.01); *Y10T 74/20317* (2015.01)

(56) References Cited

U.S. PATENT DOCUMENTS

| | | | |
|---|---|---|---|
| RE40,891 E * | 9/2009 | Yasutake | 345/173 |
| 8,161,827 B2 * | 4/2012 | Kato | G01L 3/1457 73/862.044 |
| 2003/0184171 A1 * | 10/2003 | Teraoka | F16H 48/24 310/80 |
| 2009/0272585 A1 * | 11/2009 | Nagasaka | B25J 9/1633 180/8.6 |
| 2010/0005907 A1 * | 1/2010 | Kato et al. | 73/862.044 |
| 2010/0218638 A1 * | 9/2010 | Shiina et al. | 74/496 |
| 2011/0239788 A1 * | 10/2011 | Nagasaka | B25J 13/085 73/862.338 |

FOREIGN PATENT DOCUMENTS

| | | |
|---|---|---|
| JP | 2005-297081 | 10/2005 |
| JP | 2008-180382 | 8/2008 |
| JP | 2009-58388 | 3/2009 |

* cited by examiner

LENGTH L > L'
RADIUS r > r'

CENTER OF ROTATION
OF ACTUATOR ON
PRECEDING STAGE

ACTUATOR DEVICE 10

ACTUATOR DEVICE 10

ACTUATOR DEVICE 10

ACTUATOR DEVICE 10

ACTUATOR DEVICE 10

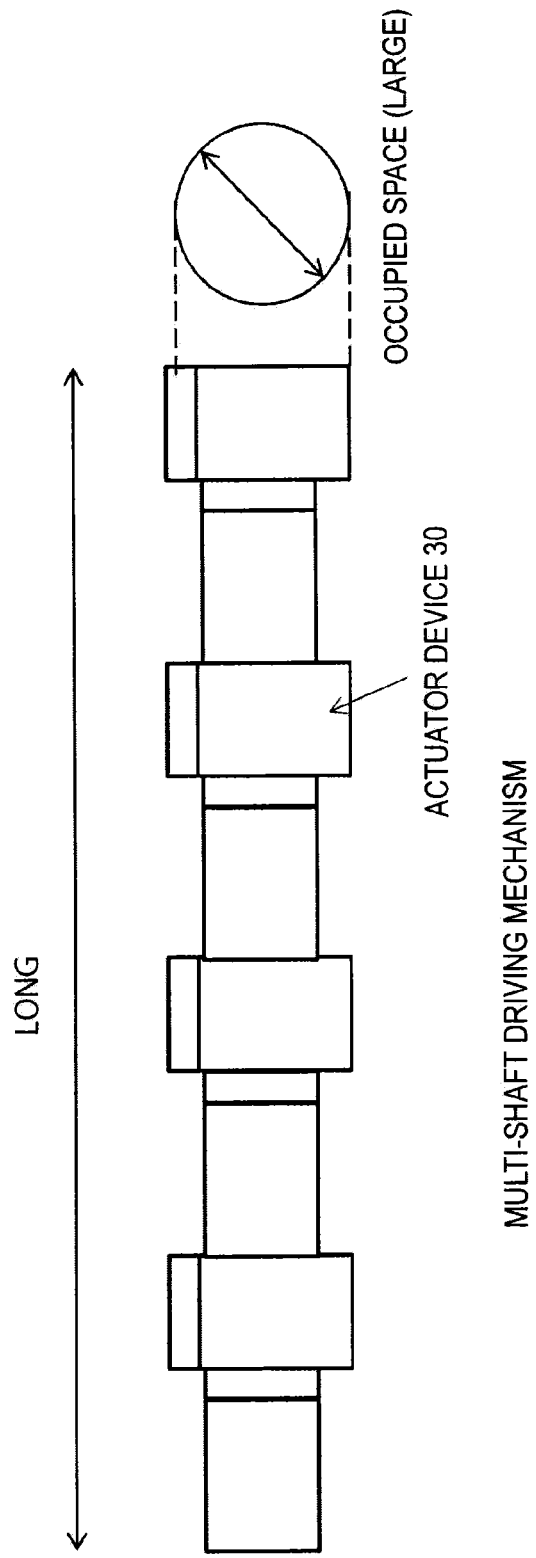

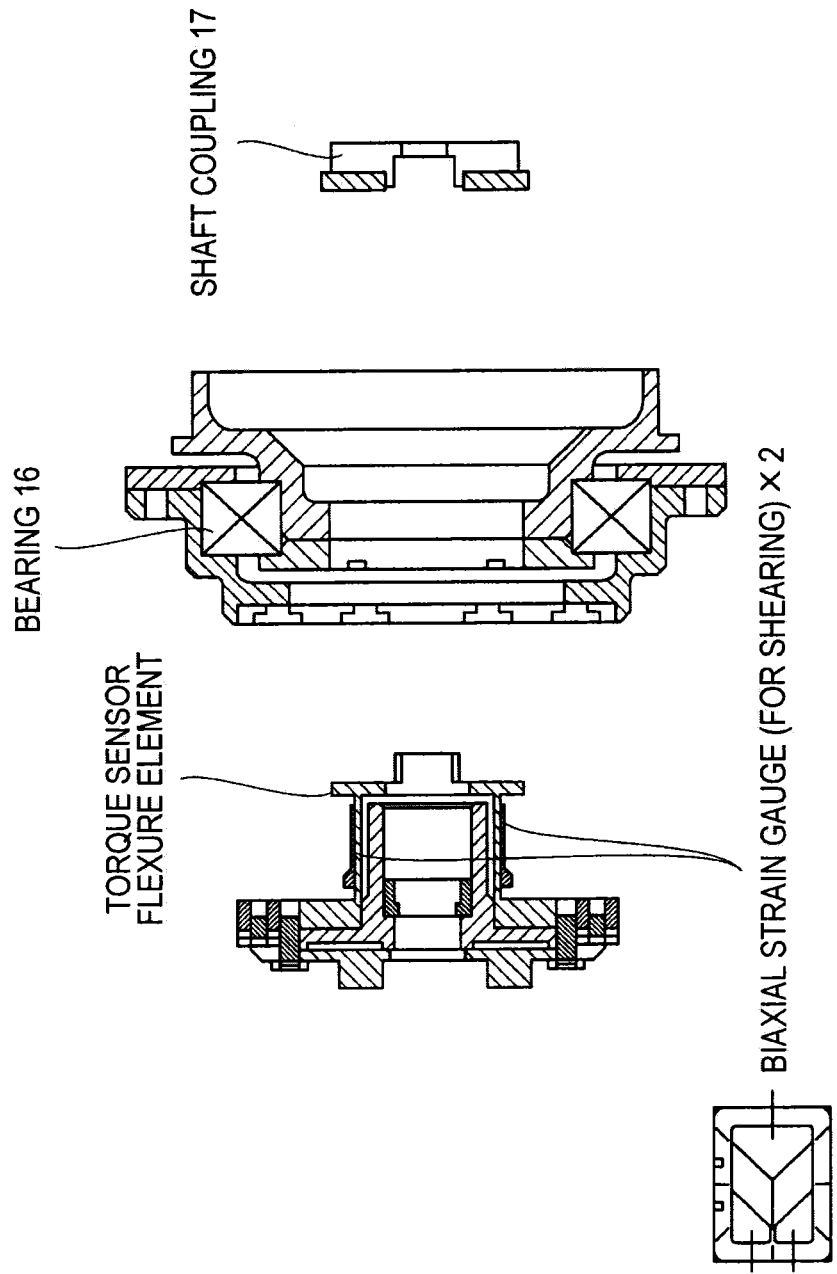

ROBOT DEVICE 100

ACTUATOR DEVICE, MULTI-SHAFT DRIVING DEVICE, AND ROBOT DEVICE

TECHNICAL FIELD

The technology disclosed in the present specification relates to an actuator device, a multi-shaft driving device, and a robot device used in a multi-shaft driving mechanism such as a multi-shaft manipulator, a robot arm, a leg structure, and a snake-shaped robot, and especially relates to the actuator device, the multi-shaft driving device, and the robot device used in a plurality of sites of the multi-shaft driving mechanism.

BACKGROUND ART

The actuator device is formed of an actuator motor alone or is modularized with a peripheral circuit, wiring, a connector, an attachment frame and the like. It is possible to realize a simple mechanism, a reduced cost, reduction in types of parts, and improved maintainability by using the same actuator devices in a plurality of sites in the multi-shaft driving mechanism such as the multi-shaft manipulator, the robot arm, the leg structure, and the snake-shaped robot. For example, a manipulator of an industrial robot formed of same modular driving devices is suggested (refer to Patent Document 1, for example).

A substantial outer shape of the modularized actuator device is a cylinder (refer to Patent Document 2, for example), a cuboid, combination of the cylinder and cuboid (semicylinder) (refer to Patent Document 3, for example), an oval sphere and the like.

In the multi-shaft driving mechanism, a structure in which another actuator is attached to an output shaft of the actuator is common. FIG. 18 illustrates a configuration example of the multi-shaft driving mechanism in which a second actuator is attached to the output shaft of a first actuator such that the output shafts thereof are orthogonal to each other and a frame is attached to the output shaft of the second actuator. In the multi-shaft driving mechanism, the first actuator and the second actuator correspond to a preceding stage and a subsequent stage, respectively. According to the illustrated mechanism, a posture (a direction of the output shaft) of the second actuator changes by rotary drive of the output shaft of the first actuator and the frame rotates about the output shaft of the second actuator to change a posture.

In a case of the multi-shaft driving mechanism illustrated in FIG. 18, a substantial occupied space of the second actuator is a space formed by a rotating body with an outermost diameter including the second actuator and the frame as illustrated in FIG. 19. In other words, when the second actuator is rotated by the first actuator, the occupied space thereof depends on shapes of the frame attached to the output shaft of the second actuator and an end of the second actuator, and the substantial occupied space is larger than an original volume of the second actuator. It may also be said that the occupied space increases when the frame is attached to the second actuator.

When the substantial occupied space of the actuator becomes large, possibility of interference with the surroundings increases correspondingly and a risk that user's finger, wiring and the like get caught therein arises. A spherical exterior (cover) may be arranged, for example, on an outer side of the driving mechanism in order to avoid such risk. However, a structure body covered with the exterior has a wasted space (vacuum or containing only air) not for an original object of the actuator (parts, torque generation, torque conversion and the like) in the driving mechanism, so that output density of the actuator device and mounting density of the parts are deteriorated. As a result, this makes a multi-joint robot formed of the actuator devices used in a plurality of sites large and limits a range in which an entire multi-joint robot may move and an operable range thereof, or reduces a range of motion of each joint.

CITATION LIST

Patent Document

Patent Document 1: JP 11-123676 A
Patent Document 2: JP 2008-180382 A
Patent Document 3: JP 2005-297081 A

SUMMARY OF THE INVENTION

Problems to be Solved by the Invention

An object of the technology disclosed in the present specification is to provide excellent actuator device, multi-shaft driving device, and robot device, which may be used in a plurality of sites of a multi-shaft driving mechanism such as a multi-shaft manipulator, a robot arm, a leg structure, and a snake-shaped robot.

Further object of the technology disclosed in the present specification is to provide the excellent actuator device, multi-shaft driving device, and robot device capable of maintaining high output density and mounting density without a large substantial occupied space even when they are used in a plurality of sites of the multi-shaft driving mechanism.

Solutions to Problems

The present application is achieved in consideration of the above-described problems, and the technology recited in claim 1 is
an actuator device, including:
a motor;
a reducer, which reduces an output of the motor;
a torque sensor driven by an outer ring relative to a stationary part of the motor to measure output torque from the reducer; and
an output shaft frame attachment portion arranged in a position offset from an end of the torque sensor.

According to the technology recited in claim 2 of the present application, the end of the torque sensor of the actuator device according to claim 1 has a shape approximated to a spherical surface.

According to the technology recited in claim 3 of the present application, the output shaft frame attachment portion of the actuator device according to claim 1 is arranged on an outer peripheral portion of the torque sensor.

According to the technology recited in claim 4 of the present application, the actuator device according to claim 1 further includes: a rotary encoder on a side opposite to the reducer of the motor.

According to the technology recited in claim 5 of the present application, an end of the rotary encoder of the actuator device according to claim 4 has a shape approximated to a spherical surface.

According to the technology recited in claim 6 of the present application, the actuator device according to claim 1 has a concave portion in the vicinity of the center.

According to the technology recited in claim 7 of the present application, the torque sensor of the actuator device according to claim 1 is a strain gauge type torsion torque sensor.

The technology recited in claim 8 of the present application is a multi-shaft driving device, including:

a first actuator on a preceding stage and a second actuator on a subsequent stage formed of same actuator devices, wherein each of the actuator devices has a shape approximated to a spherical surface on both ends and a concave portion in the vicinity of the center, and the first and second actuators are coupled such that the shape approximated to the spherical surface of an end on an output side of the first actuator abuts the concave portion in the vicinity of the center of the second actuator.

According to the technology recited in claim 9 of the present application, in the multi-shaft driving device according to claim 8, the actuator device is provided with a motor, a reducer, which reduces an output of the motor, a torque sensor having an end in a shape approximated to a spherical surface, which measures output torque from the reducer, and a rotary encoder having an end in a shape approximated to a spherical surface attached to a side opposite to the reducer of the motor.

According to the technology recited in claim 10 of the present application, the torque sensor included in the actuator device of the multi-shaft driving device according to claim 9 is configured to be driven by an outer ring relative to a stationary part of the motor.

According to the technology recited in claim 11 of the present application, in the multi-shaft driving device according to claim 10, the torque sensor is a strain gauge type torsion torque sensor.

According to the technology recited in claim 12 of the present application, in the multi-shaft driving device according to claim 9, the second actuator includes an output shaft frame attachment portion arranged in a position offset from the end of the torque sensor, and the multi-shaft driving device is further provided with an output shaft frame attached to the output shaft frame attachment portion.

According to the technology recited in claim 13 of the present application, in the multi-shaft driving device according to claim 12, the output shaft frame attachment portion is arranged on an outer peripheral portion of the torque sensor.

According to the technology recited in claim 14 of the present application, the multi-shaft driving device according to claim 8 further includes an exterior having a diameter corresponding to an occupied space of the second actuator at a time when the first actuator is driven.

The technology recited in claim 15 of the present application is a robot device, including:

a plurality of links and a plurality of joints connecting the links;

a plurality of drive units, which drive the plurality of joints; and a controller, which controls the plurality of drive units, wherein at least a part of the plurality of drive units is formed of an actuator device provided with a motor, a reducer, which reduces an output of the motor, a torque sensor driven by an outer ring relative to a stationary part of the motor to measure output torque from the reducer, and an output shaft frame attachment portion arranged in a position offset from an end of the torque sensor.

The technology recited in claim 16 of the present application is a robot device, including:

a plurality of links and a plurality of joints connecting the links;

a plurality of drive units, which drive the plurality of joints; and a controller, which controls the plurality of drive units, wherein at least a part of the drive units, which drive a joint site formed of orthogonal two degrees of freedom, is driven by a first actuator on a preceding stage and a second actuator on a subsequent stage formed of same actuator devices, each of the actuator devices has a shape approximated to a spherical surface on both ends and a concave portion in the vicinity of the center, and the first and second actuators are coupled such that the shape approximated to the spherical surface of an end on an output side of the first actuator abuts the concave portion in the vicinity of the center of the second actuator.

According to the technology recited in claim 17 of the present application, the robot device according to claim 15 further includes: a moving unit, which moves the robot device.

According to the technology recited in claim 18 of the present application, the robot device according to claim 15 further includes a recognizing unit, which recognizes an outer environment. The controller is configured to control the plurality of drive units based on a recognition result by the recognizing unit.

Effects of the Invention

According to the technology disclosed in the present specification, it is possible to provide the excellent actuator device, multi-shaft driving device, and robot device, which may be used in a plurality of sites of the multi-shaft driving mechanism such as the multi-shaft manipulator, the robot arm, the leg structure, and the snake-shaped robot.

Also, according to the technology disclosed in the present specification, it is possible to provide the excellent actuator device, multi-shaft driving device, and robot device capable of maintaining the high output density and mounting density without the large substantial occupied space even when they are used in a plurality of sites of the multi-shaft driving mechanism.

Still another object, feature, and advantage of the technology disclosed in the present specification will become clear by more detailed description with reference to an embodiment to be described later and the attached drawings.

BRIEF DESCRIPTION OF DRAWINGS

FIG. 8B is a view schematically illustrating the multi-shaft driving mechanism formed of a plurality of actuator devices 30 without the concave portion in the vicinity of the center thereof coupled in series.

FIG. 12C is a cross-sectional view of FIG. 12B.

MODE FOR CARRYING OUT THE INVENTION

An embodiment of the technology disclosed in the present specification is hereinafter described in detail with reference to the drawings.

Figure 1:
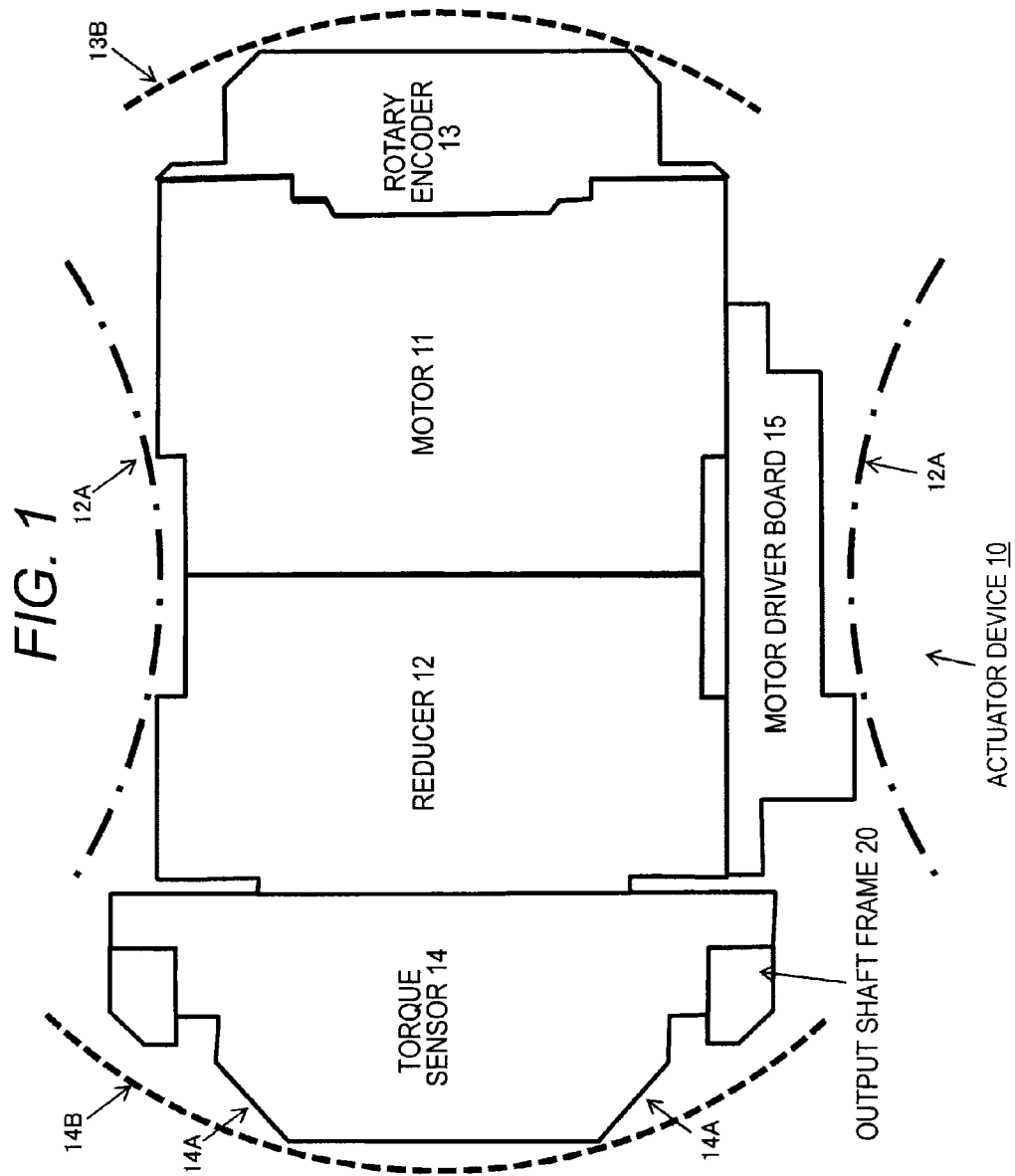
FIG. 1 is a view schematically illustrating a configuration of an actuator device 10 according to one embodiment of the technology disclosed in the present specification.

FIG. 1 schematically illustrates a configuration of an actuator device 10 according to one embodiment of the technology disclosed in the present specification. The illustrated actuator device 10 is provided with a motor 11, a reducer 12, a rotary encoder 13, a torque sensor 14, and a motor driver board 15.

The motor 11 is a brushless motor, for example. An entire length in an output shaft direction of an entire actuator device 10 is preferably made short in view of reducing an occupied area thereof when this is used as an actuator on a subsequent stage rotated by an actuator on a preceding stage in a multi-shaft driving mechanism. A large-diameter motor is used for reducing the entire length while maintaining an output of the motor 11. A wave reduction gear such as a harmonic drive (TM) may be used, for example, as the reducer 12.

As illustrated in FIG. 1, the torque sensor 14 located on one end face of the actuator device 10 has a chamfered shape as seen from a side as indicated by reference numeral 14A with an end face portion having a shape approximated to a spherical surface as indicated by dotted line 14B. As described later, the torque sensor 14 has an integral structure with an output shaft of the motor 11 through the reducer 12 and is attached to a stationary part of the actuator device 10 so as to be driven by an outer ring.

An output shaft frame 20 is attached to an outer peripheral portion of the torque sensor 14. As illustrated, an attachment position of the output shaft frame 20 is offset from the end face of the torque sensor 14 in a direction of the actuator device 10 (on a side of a stationary part case of the actuator device 10). For reference, FIGS. 5A to 5D illustrate the actuator device 10 to which the output shaft frame 20 is attached seen from an angle, seen from an output shaft side, seen from above, and seen from a side, respectively.

With reference to FIG. 1 again, the rotary encoder 13 located on the other end face of the actuator device 10 is configured to have a smaller diameter than that of the motor 11. In combination with the chamfered shape of the torque sensor 14 located on one end face of the actuator device 10 (as described above), the entire actuator device 10 is not cylindrical but this has front and rear portions in shapes approximated to the spherical surface indicated by dotted lines 13B and 14B.

Figure 13:
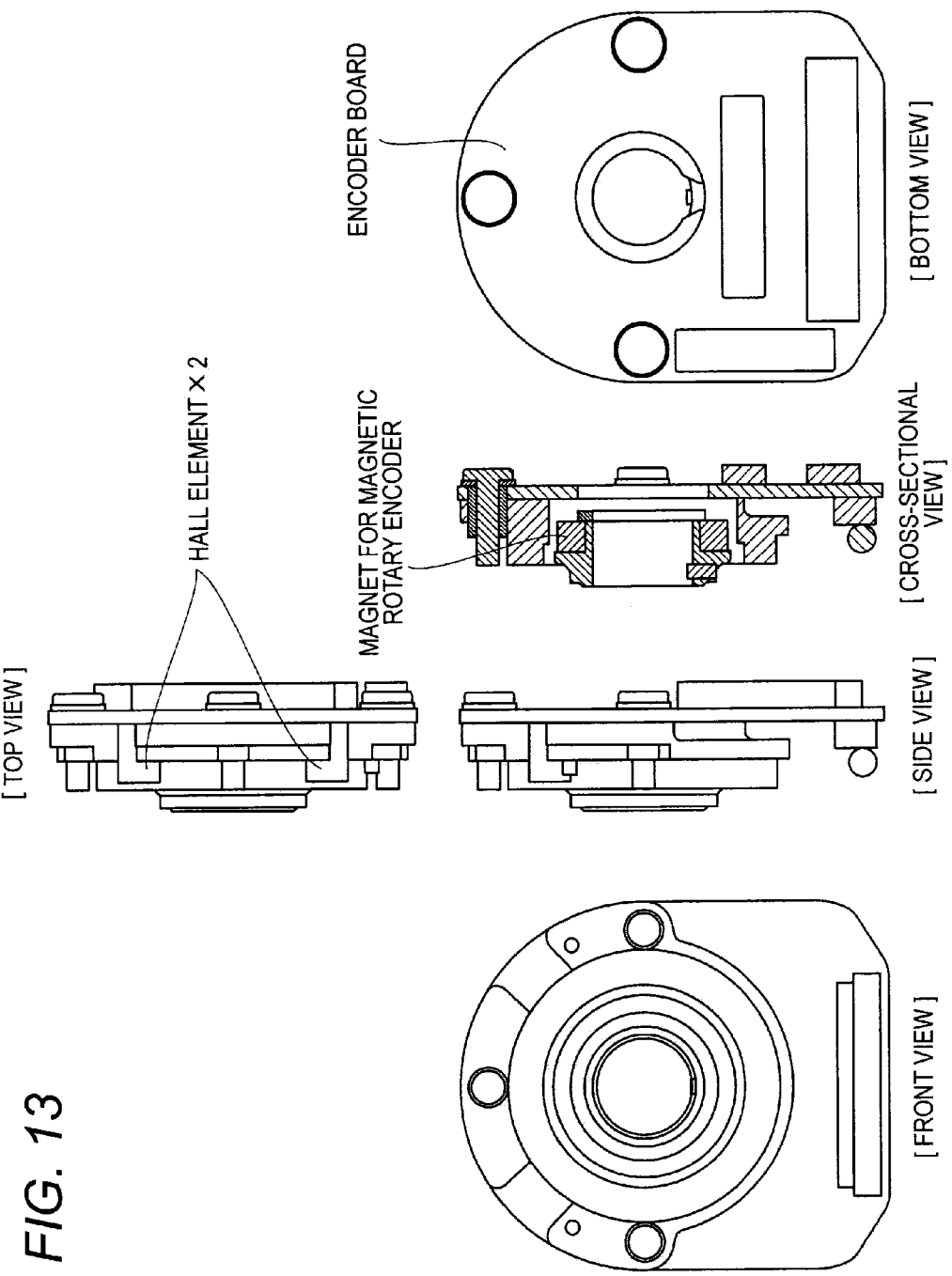
FIG. 13 illustrates a front view, a top view, a side view, a sectional side view, and a bottom view of a rotary encoder 13.

A magnetic one may be applied to the rotary encoder 13. In this case, a permanent magnet is arranged on a side of a rotor of the motor 11 and a Hall element is arranged on a side of a stator of the motor 11. FIG. 13 illustrates a front view, a top view, a side view, a sectional side view, and a bottom view of the rotary encoder 13. As illustrated, a magnet for magnetic rotary encoder is attached on the side of the rotor of the motor 11 and two Hall elements are attached on a side of an encoder board, which serves as the stator.

Figure 18:
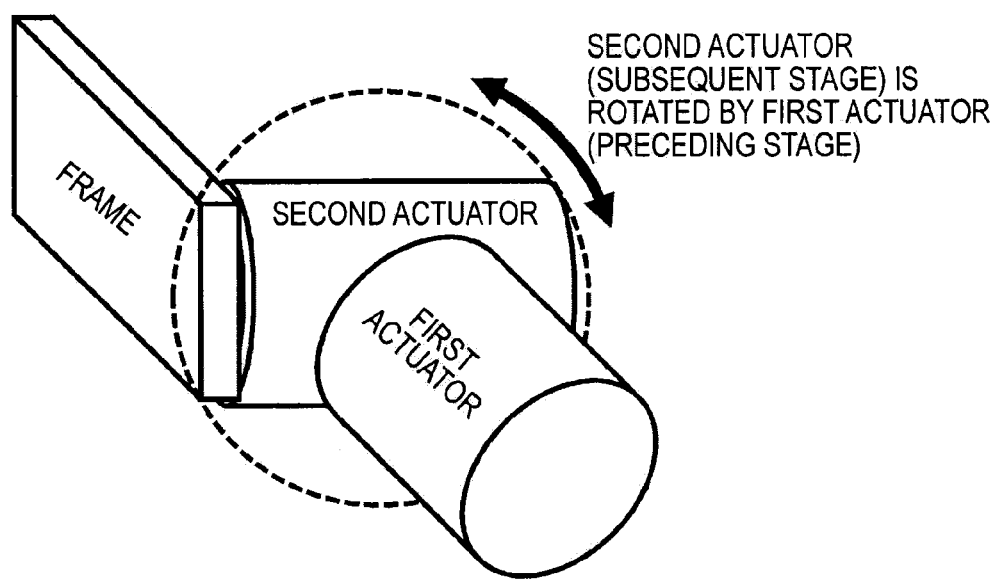
FIG. 18 is a view illustrating a configuration example of the multi-shaft driving mechanism.
Figure 19:
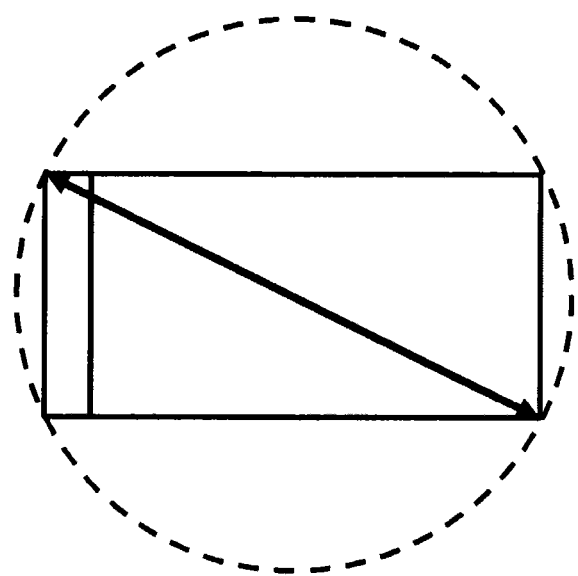
FIG. 19 is a view illustrating a substantial occupied space of a second actuator in the multi-shaft driving mechanism illustrated in FIG. 18.

When the actuator device 10 is used as a second actuator in the multi-shaft driving mechanism illustrated in FIG. 18, a dimension in the output shaft direction is desirably made short, and a compact rotary encoder 13 is required for realizing this. A compact permanent magnet has reduced magnetic flux density and flux variation decreases as a radius of rotation decreases, so that there is fear that sensitivity is deteriorated. Therefore, a magnet with high magnetic force such as a samarium-cobalt magnet is preferably used.

Figure 2:
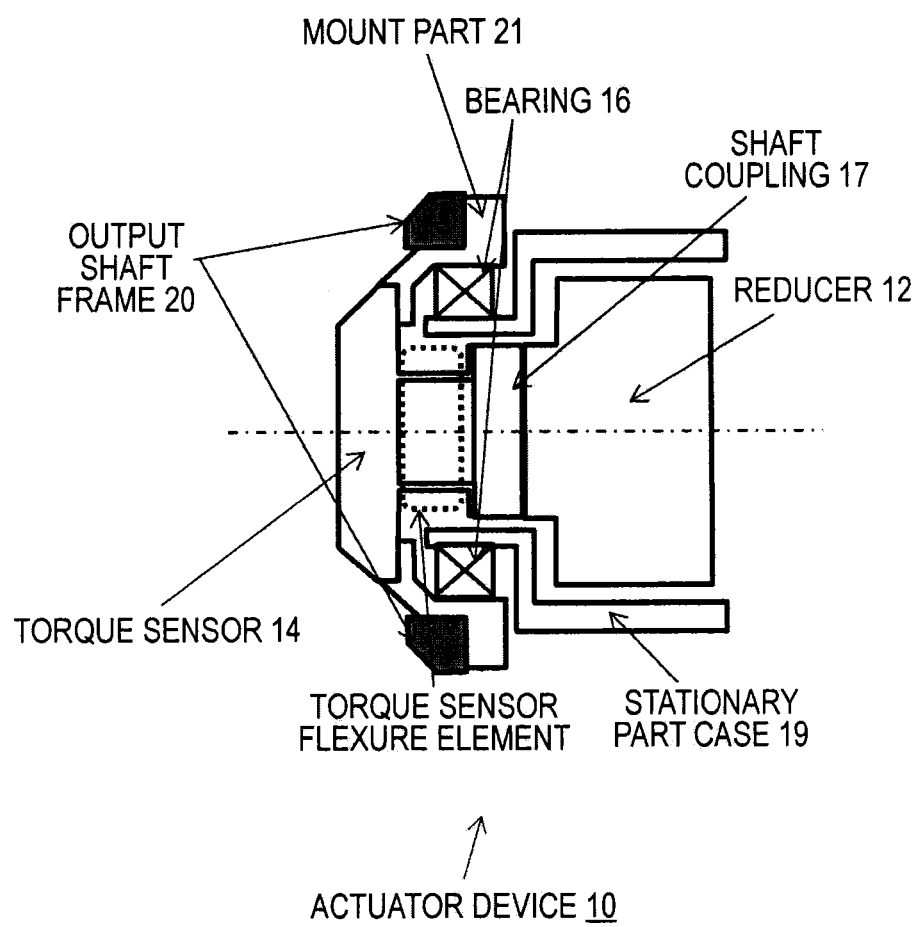
FIG. 2 is a view illustrating a cross-sectional configuration of the actuator device 10 mainly on an output shaft side.
Figure 6:
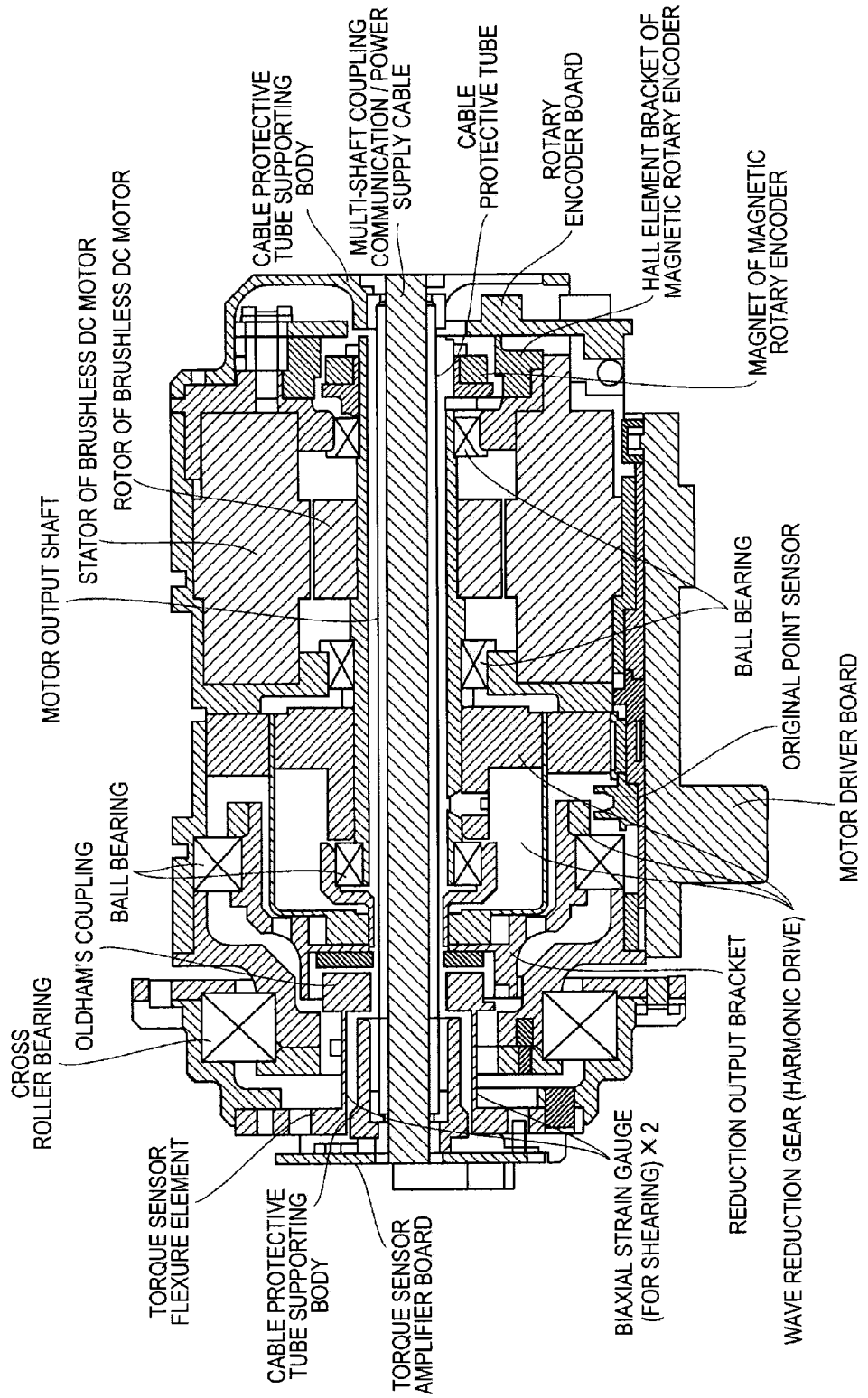
FIG. 6 is a view illustrating a detailed cross-sectional configuration of an entire actuator device 10.

FIG. 2 illustrates a cross-sectional configuration of the actuator device 10 mainly on the output shaft side. For reference, a detailed cross-sectional configuration of the entire actuator device 10 is illustrated in FIG. 6.

The torque sensor 14 having the integral structure with the output shaft of the motor 11 through the reducer 12 is coupled to an output shaft of the reducer 12 through a shaft coupling 17 such as an Oldham's coupling. A portion enclosed by a dotted line corresponds to a flexure element. A strain gauge type torsion torque sensor may be used, for example, as the torque sensor 14. This type of torque sensor is described in "Introduction to Strain Measurement Using Strain Gauge—from History to Measurement", Sho TAKAHASHI et al., Taiseisya, for example.

The torque sensor 14 is connected to a bearing 16 such as a cross roller bearing through a mount part 21 corresponding to an output shaft. As illustrated, the torque sensor 14 is driven by the outer ring relative to the stationary part case 19 of the actuator device 10. The bearing 16 has a larger diameter in outer ring drive than in inner ring drive. The large-diameter bearing 16 may easily bear thrust force and moment applied to the output shaft.

The torque sensor 14 has an attachment surface of the output shaft frame 20 in a position offset from the bearing 16 on the side of the stationary part case 19. Therefore, the entire length of the actuator device 10 in the output shaft direction does not change also after the output shaft frame 20 is attached (with the attached output shaft frame 20) and an occupied space does not increase.

Figure 3:
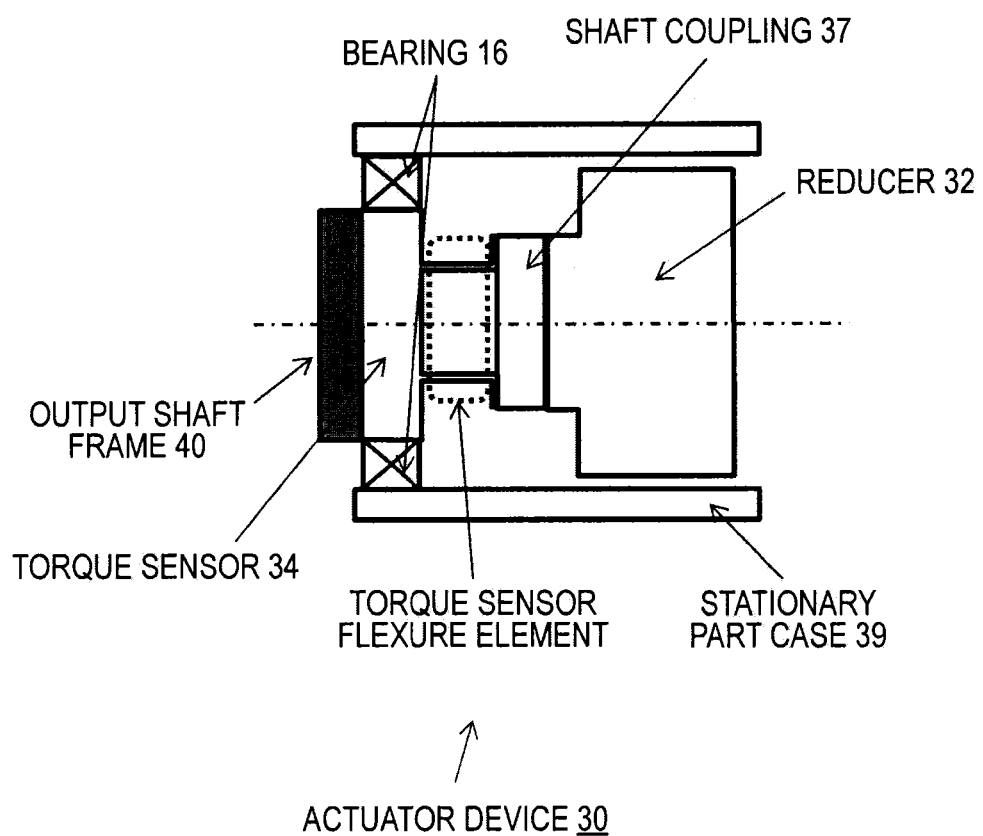
FIG. 3 is a view illustrating a cross-sectional configuration on an output shaft side of an actuator device 30 in which a torque sensor 34 is attached to a stationary part case 39 so as to be driven by an inner ring.

FIG. 3 illustrates a cross-sectional configuration on an output shaft side of an actuator device 30 in which a torque sensor 34 also serving as an output shaft is attached to a stationary part case 39 so as to be driven by an inner ring for comparison with the actuator device 10 illustrated in FIG. 2. When the output shaft is driven by the inner ring, as is understood from the drawing, an attachment surface of an output shaft frame 40 must be arranged on an end face of the torque sensor 34, so that this cannot be offset from the bearing 16 on a side of the stationary part case 39. Therefore, when the actuator device 30 is rotated by another actuator device (the actuator on the preceding stage), the occupied space thereof depends on shapes of the output shaft frame 40 and an end on an output side of the actuator device 30 and a substantial occupied space becomes larger than an original volume of the actuator device 30.

Figure 4:
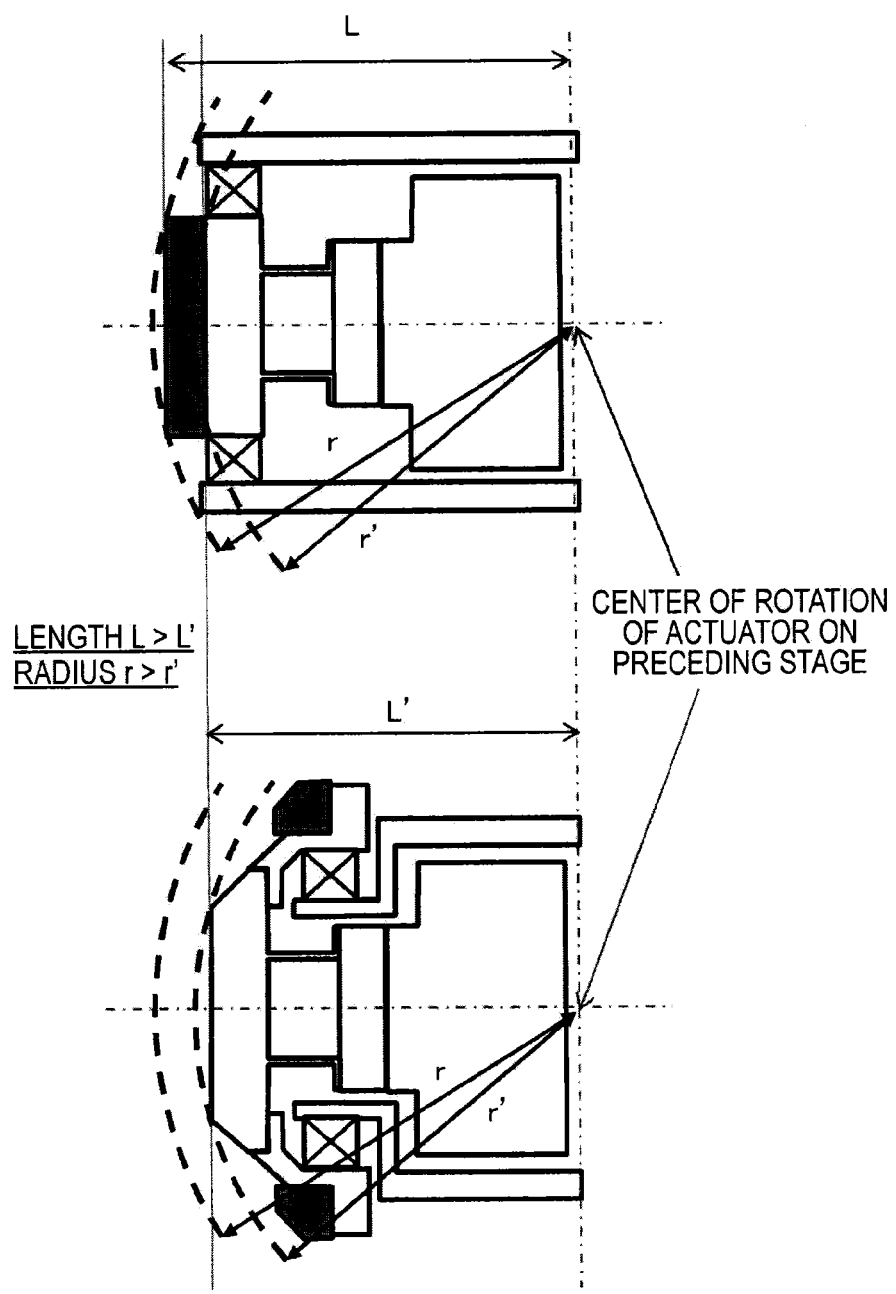
FIG. 4 is a view illustrating spaces substantially occupied by the actuator device 10 illustrated in FIGS. 1 and 2 and the actuator device 30 illustrated in FIG. 3 when they are rotated by an actuator on a preceding stage for comparison.
Figure 5A:
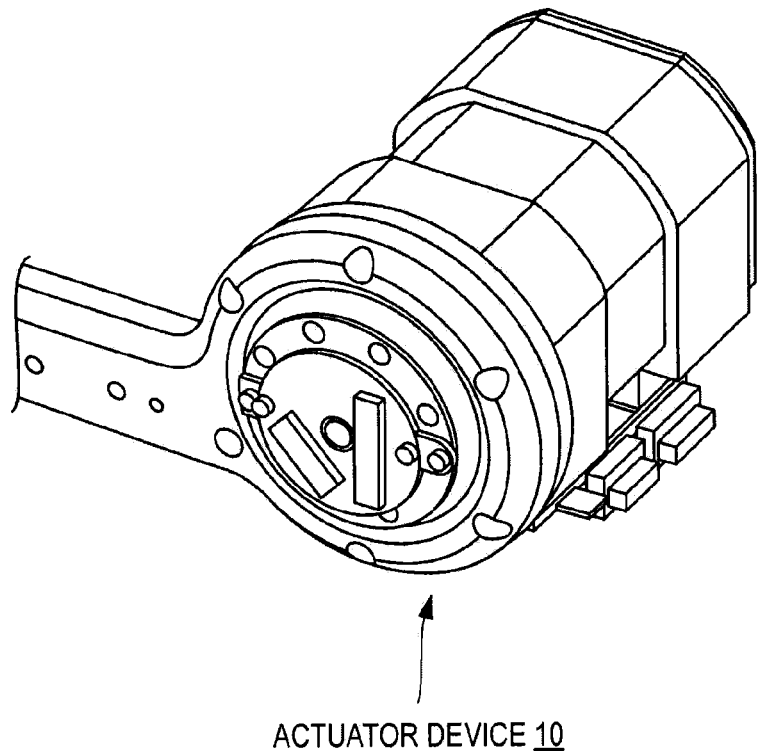
FIG. 5A is a view illustrating the actuator device 10 to which an output shaft frame 20 is attached seen from an angle.
Figure 5B:
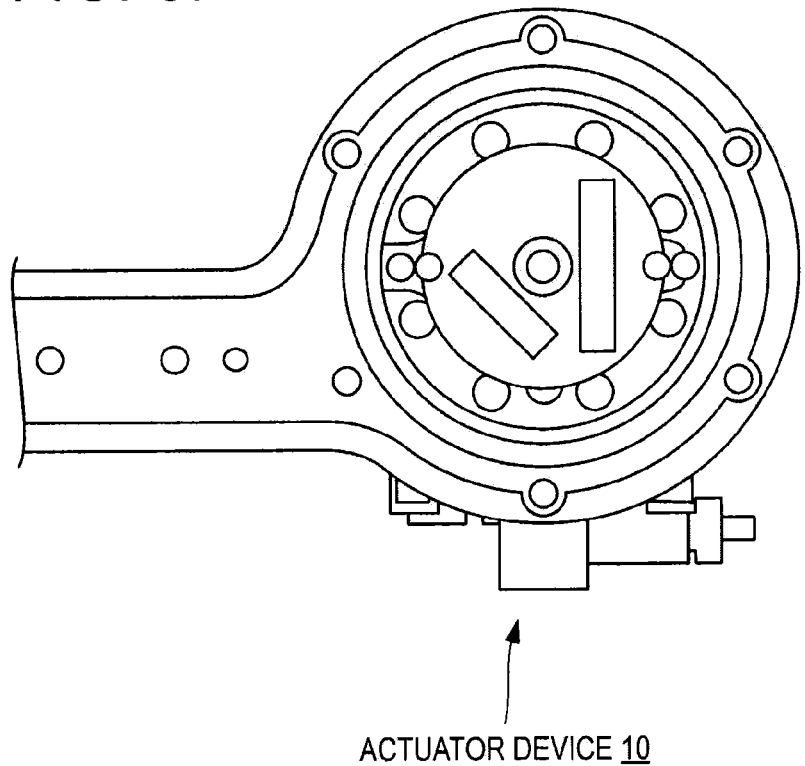
FIG. 5B is a view illustrating the actuator device 10 to which the output shaft frame 20 is attached seen from an output shaft side.
Figure 5C:
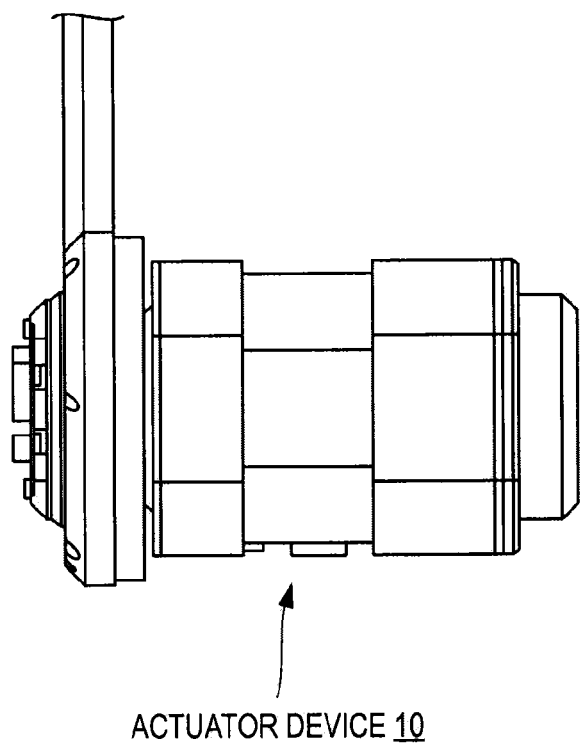
FIG. 5C is a view illustrating the actuator device 10 to which the output shaft frame 20 is attached seen from above.
Figure 5D:
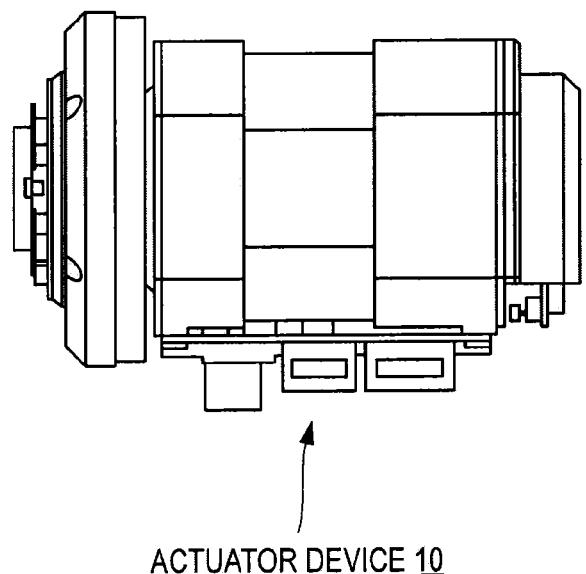
FIG. 5D is a view illustrating the actuator device 10 to which the output shaft frame 20 is attached seen from a side.

FIG. 4 illustrates spaces substantially occupied when the actuator device 10 illustrated in FIGS. 1 and 2 and the actuator device 30 illustrated in FIG. 3 are rotated by the actuator on the preceding stage for comparison. In the drawing, the output shaft frame is shown in gray.

In a case of the actuator device 10 illustrated in FIGS. 1 and 2, the attachment surface of the output shaft frame 20 is arranged in the position offset from the bearing 16 on the side of the stationary part case 19, so that length L' from the center of rotation of the actuator on the preceding stage does not change even when the output shaft frame 20 is attached. Therefore, radius of rotation r' at a time when the actuator device 10 is rotated about the center of rotation of the actuator on the preceding stage does not change and the space substantially occupied by the actuator device 10 is the same as an original volume of the actuator device 10.

On the other hand, in a case of the actuator device 30 illustrated in FIG. 3, when the output shaft frame 40 is attached to the end face of the torque sensor 34, length L from the center of rotation of the actuator on the preceding stage is longer than that before the attachment (L>L'). Therefore, radius of rotation r at a time when the actuator device 30 is rotated about the center of rotation of the actuator on the preceding stage also increases (r>r'), so that the space substantially occupied by the actuator device 30 is larger than the original volume of the actuator device 30.

Therefore, when the actuator device 10 is used as the actuator on the subsequent stage and the output shaft frame 20 is attached thereto in the multi-shaft driving mechanism, the entire length thereof may be made short and the space substantially occupied by the actuator device 10 may be made compact. According to this, when a multi-joint robot is formed of the actuator devices 10 used in a plurality of sites and the robot is allowed to move, it is possible to decrease possibility that this collides with another object, thereby improving safety. An effect that a space in which the multi-joint robot can move and a space at a time of storage or transportation are made large is also provided. When a multi-degree-of-freedom manipulator is formed of the actuator devices 10 used in a plurality of sites, this contributes to increase a range of motion of another joint.

When adding a remark to FIG. 1, a concave portion as indicated by dashed-dotted line 12A is formed in the vicinity of the center of the actuator device 10. This is due to a large-diameter brushless motor used as the motor 11 and a large-diameter bearing used as the bearing 16 because the output shaft attachment surface of the torque sensor 14 is driven by the outer ring as described above. The large-diameter brushless motor is used as the motor 11, so that the entire length of the actuator device 10 is made short (as described above). The end faces of the torque sensor 14 and the rotary encoder 13 on ends of the actuator device 10 have the shape approximated to the spherical surface as indicated by dotted lines 13B and 14B.

Figure 7:
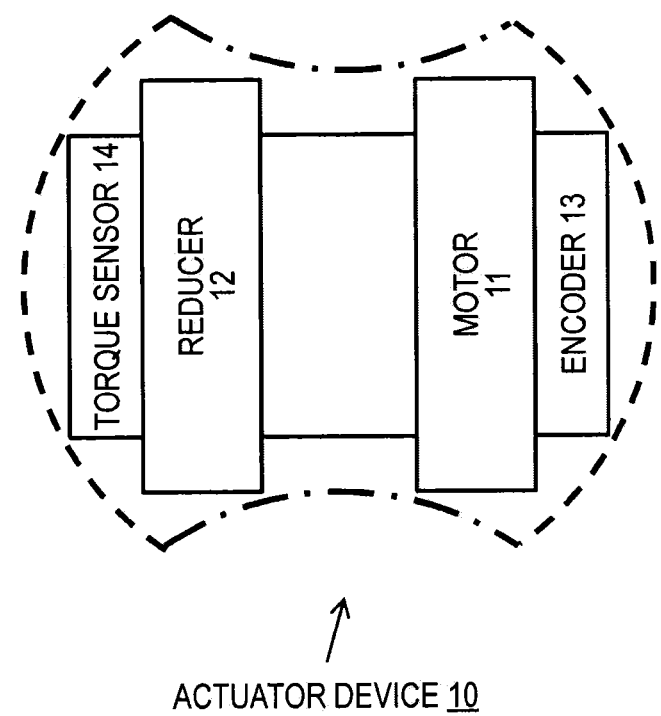
FIG. 7 is a view schematically illustrating the configuration of the actuator device 10 in which a large-diameter motor is used as a power source and a large-diameter bearing is used in an output stage.
Figure 8A:
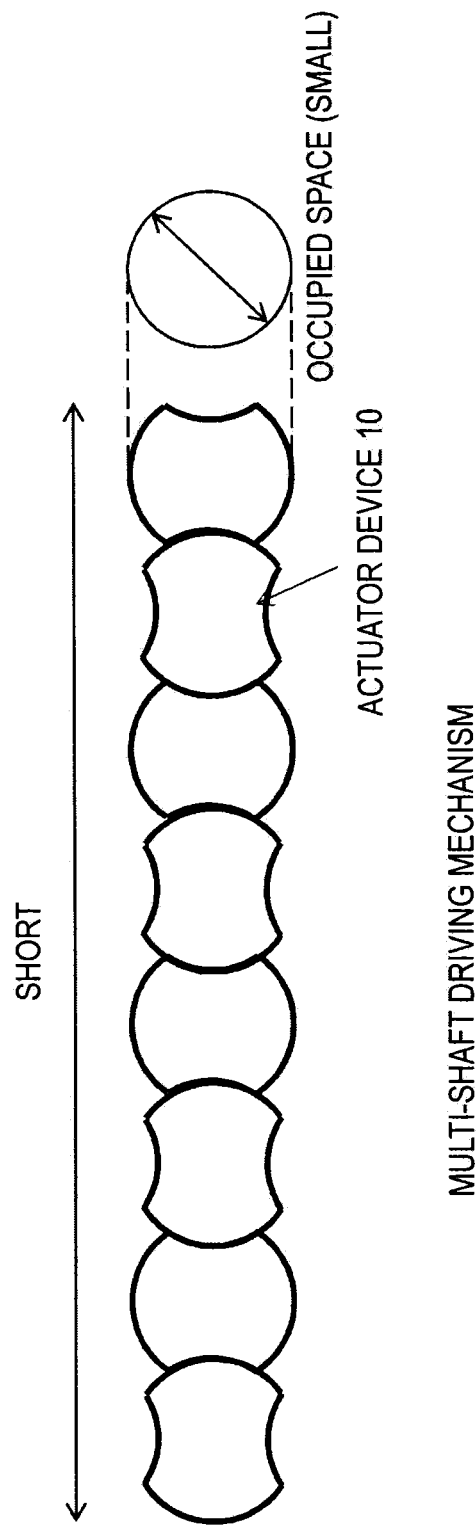
FIG. 8A is a view schematically illustrating a multi-shaft driving mechanism formed of a plurality of actuator devices 10 having a concave portion in the vicinity of the center thereof coupled in series.

FIG. 7 schematically illustrates the configuration of the actuator device 10 in which the large-diameter motor is used as a power source and the large-diameter bearing is used on an output stage. FIG. 8A schematically illustrates the multi-shaft driving mechanism formed of a plurality of actuator devices 10 having the concave portion in the vicinity of the center thereof coupled in series. FIG. 8B illustrates the multi-shaft driving mechanism formed of cylindrical actuator devices 30 without the concave portion in the vicinity of the center thereof coupled in series for comparison. In both of the multi-shaft driving mechanisms, adjacent actuator devices are coupled such that the output shaft directions thereof are orthogonal to each other.

Figure 9:
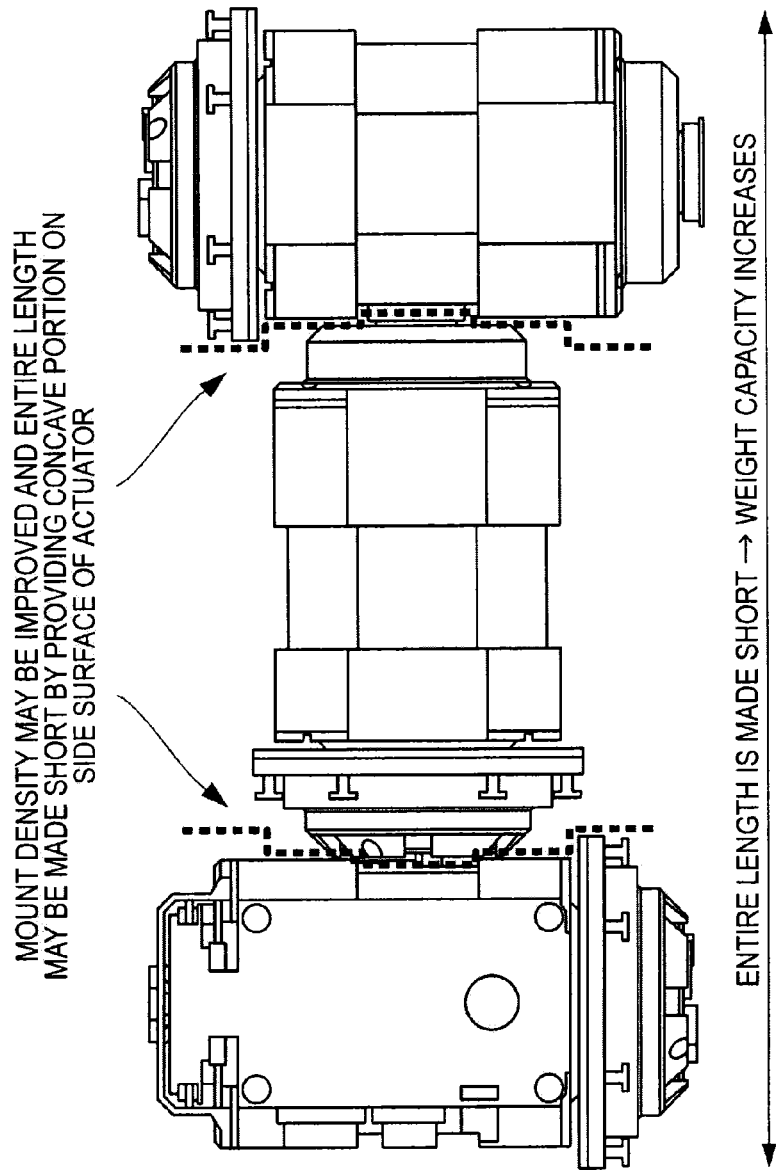
FIG. 9 is a view illustrating a state of an actual actuator 10 in which the concave portion in the vicinity of the center abuts a spherical shape on an end face of the actuator devices 10 on preceding and subsequent stages.

The actuator device 10 has the concave portion in the vicinity of the center and the both ends in the shape approximated to the spherical surface. Therefore, when a plurality of actuator devices 10 is coupled in series as illustrated in FIG. 8A, a spherical shape of an output unit (the end face of the torque sensor 14) of the actuator device 10 on the preceding stage abuts a surface of the concave portion in the vicinity of the center of the actuator device 10 on the subsequent stage. The concave portion in the vicinity of the center on the subsequent stage abuts the spherical shape of an input unit (the end face of the rotary encoder 13) on a further subsequent stage. FIG. 9 illustrates a state of an actual actuator device 10 in which the concave portion in the vicinity of the center abuts the spherical shape of the end faces of the actuator devices 10 on the preceding and subsequent stages.

Therefore, when the same number of actuator devices 10 are coupled in series, the concave portion in the vicinity of the center abuts the spherical shape of the end faces of the actuator devices 10 on the preceding and subsequent stages as described above and packaging density is improved, so that an entire length of the multi-shaft driving mechanism is shorter than that in a case in which the cylindrical actuator devices without relationship between the spherical surface and the concave portion are coupled in series. Since the large-diameter motor 11 with a short dimension is used, the substantial occupied space of the actuator device 10 on the subsequent stage when the actuator device 10 on the subsequent stage is driven by the actuator device 10 on the preceding stage is small.

Figure 14:
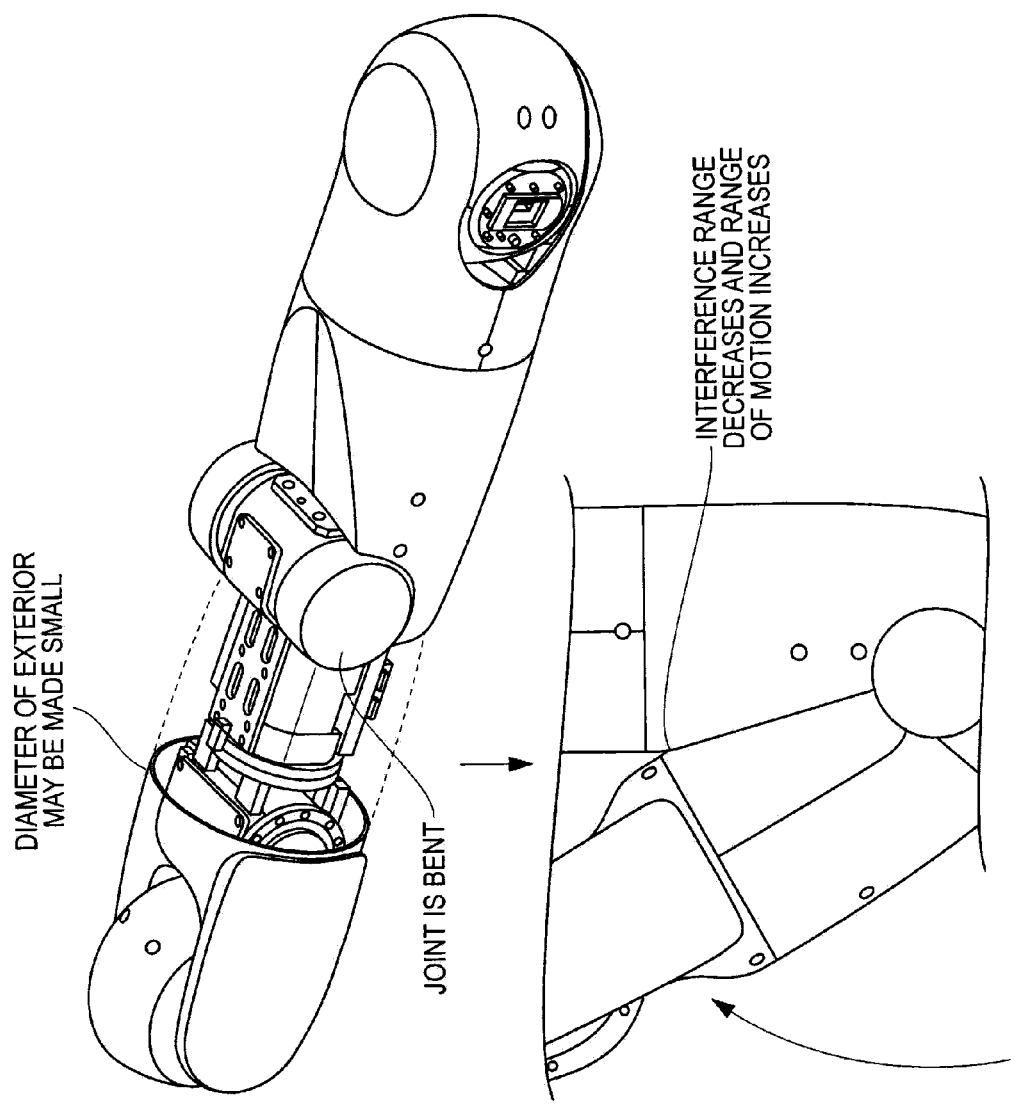
FIG. 14 is a view illustrating a robot arm formed of the actuator devices 10 used in a plurality of sites.

FIG. 14 illustrates a robot arm formed of the actuator devices 10 used in a plurality of sites. As described above, the substantial occupied space of the actuator device 10 on the subsequent stage is small, so that a diameter of an exterior, which covers the multi-shaft driving mechanism, may be made small. Since an interference range is small when the joint is bent, the range of motion of the joint increases.

Figure 10:
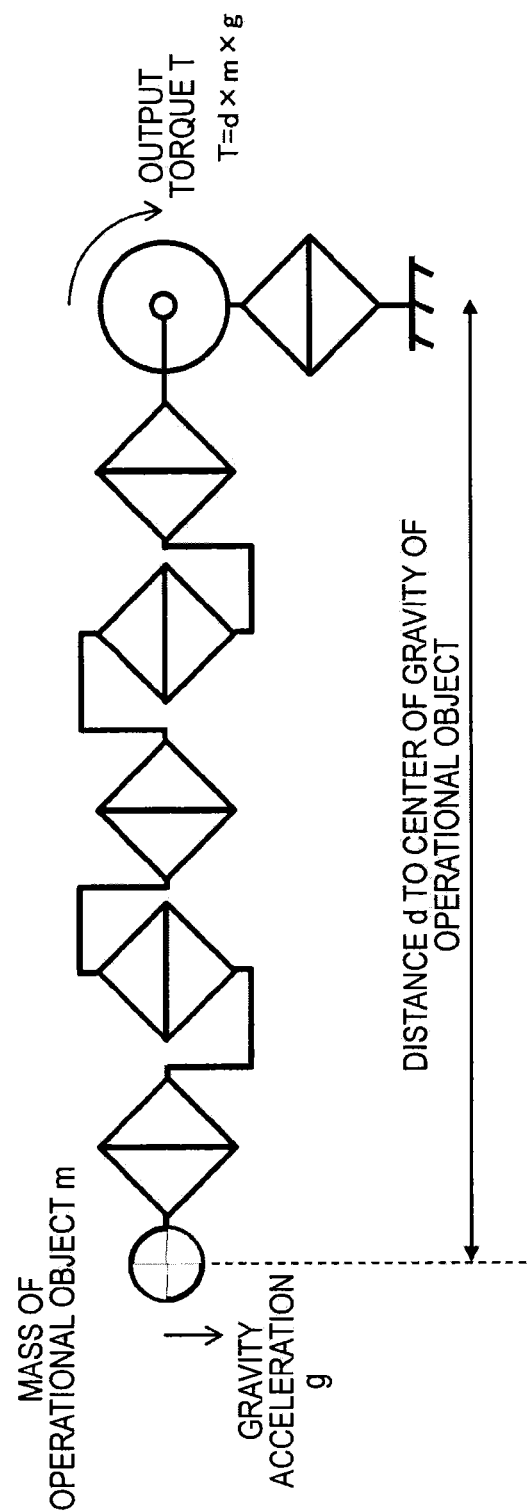
FIG. 10 is a view illustrating a degree-of-freedom configuration of the multi-shaft driving mechanism formed of seven joints.

FIG. 10 illustrates a degree-of-freedom configuration of a multi-joint manipulator formed of seven joints. Herein, supposing that a mass of an operational object of the manipulator is set to m, gravity acceleration is set to g, the joint on a second stage is responsible for motion to lift the operational object, and a distance from the joint to the center of gravity of the operational object is set to d, output torque T of the joint on the second stage required for lifting the operational object is represented as T=d×m×g. When the actuator device 10 is used at each of the seven joints, distance d becomes short and output torque T becomes small. On the other hand, with the same torque of the actuator used for driving the joint, weight capacity decreases as entire length d of the multi-joint manipulator is longer. That is to say, it may be said that, when the multi-shaft driving mechanism is formed of the same actuator devices 10, the entire length thereof becomes short as illustrated in FIG. 8A, so that the weight capacity increases.

Since the large-diameter motor 11, which is short, is used, the dimension in the output shaft direction of the actuator device 10 is short. Therefore, as illustrated in FIG. 8A, the area occupied when the actuator device 10 on the subsequent stage is rotated by the actuator device 10 on the preceding stage is smaller than that in a case of the cylindrical shape.

Figure 11:
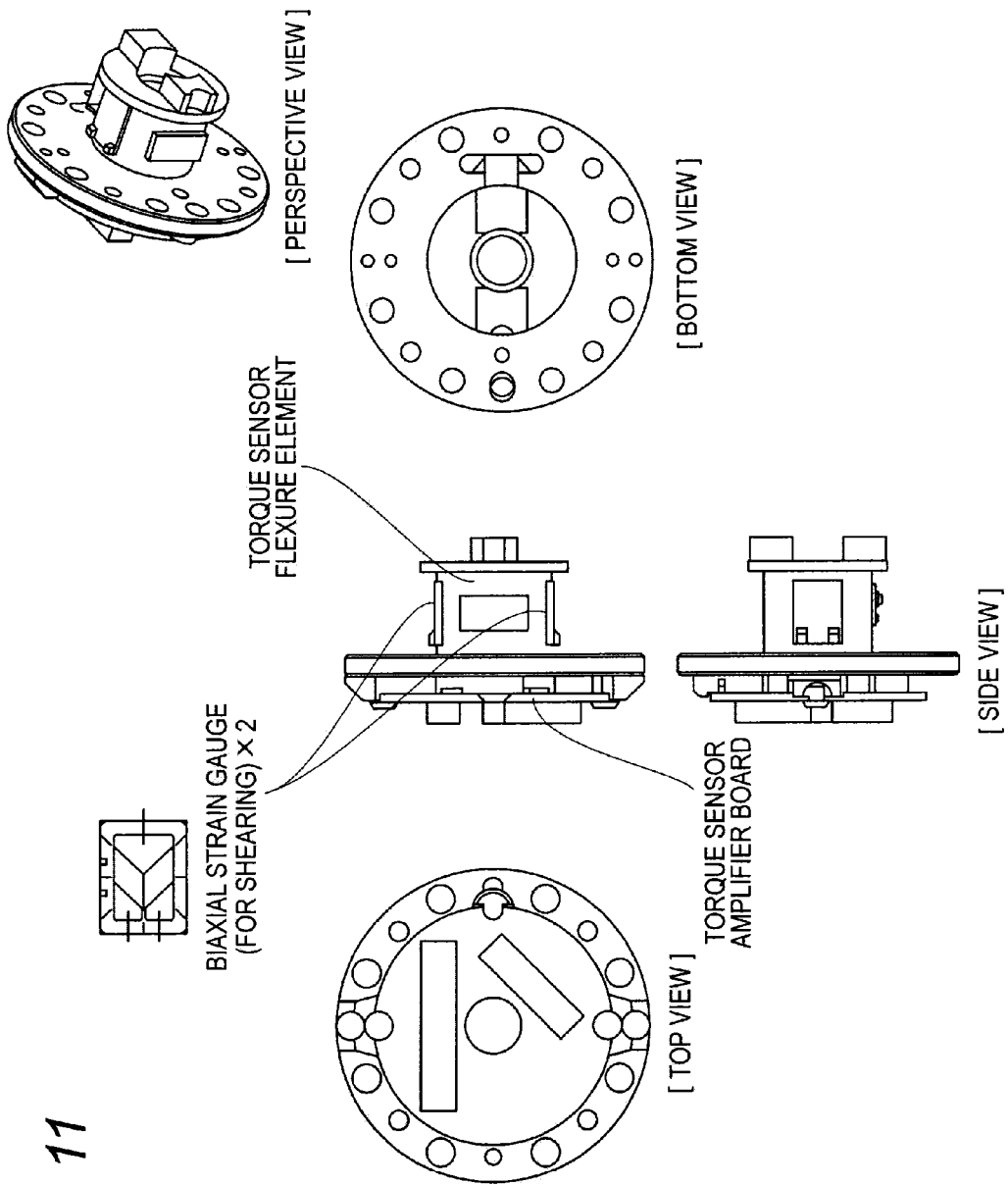
FIG. 11 illustrates a top view, a bottom view, a side view, and a perspective view of a torque sensor 14.

The torque sensor 14 is a general torsion type. FIG. 11 illustrates a top view, a bottom view, a side view, and a perspective view of the torque sensor 14. As illustrated, the torque sensor 14 is formed of a substantial disk-shaped site, which serves as one end face of the actuator device 10, and a substantial cylindrical site, which serves as the flexure element. A circuit board such as an amplifier board of the torque sensor 14 is mounted on a surface of the disk-shaped site. Two biaxial strain gauges for sharing are bonded to a surface of the cylindrical site.

Figure 12A:
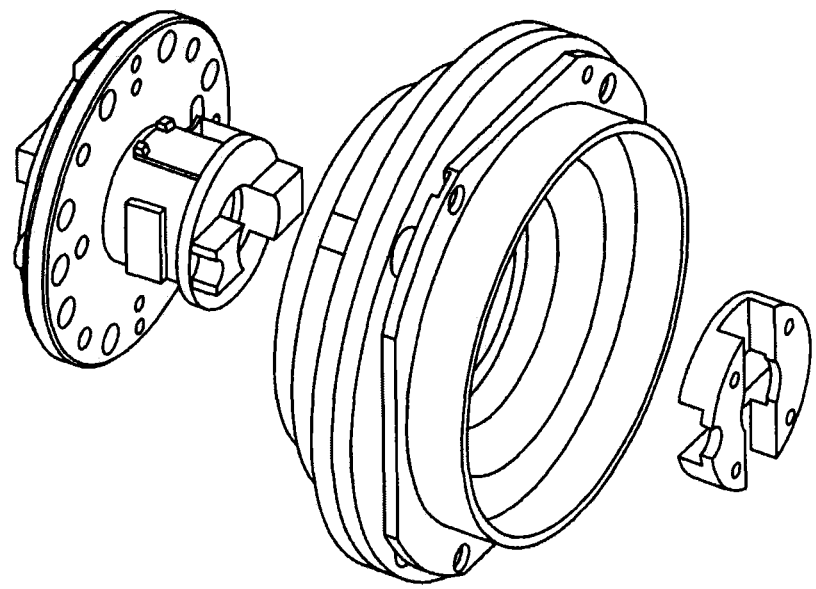
FIG. 12A is a perspective view of a state in which the torque sensor 14 is assembled.
Figure 12B:
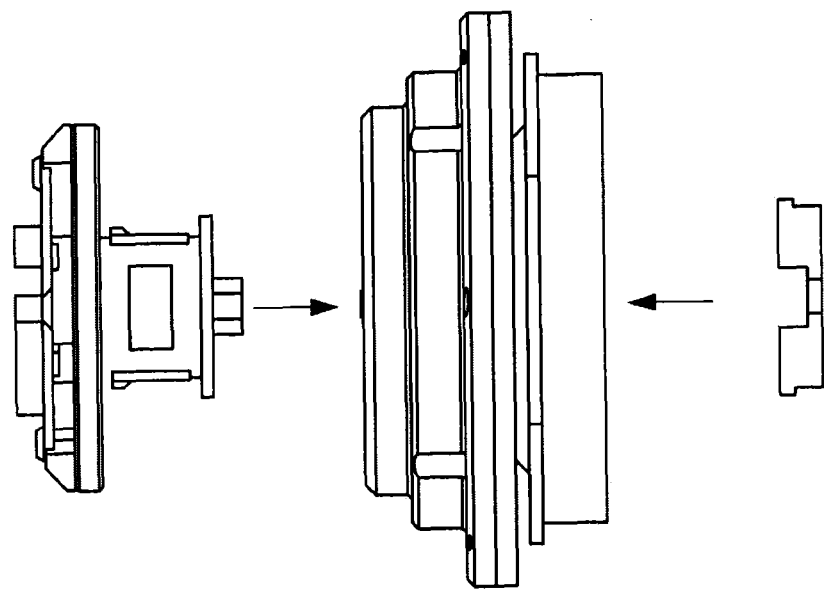
FIG. 12B is a side view of the state in which the torque sensor 14 is assembled.

The torque sensor 14 having the integral structure with the output shaft of the motor 11 through the reducer 12 is coupled to the output shaft of the reducer 12 through the shaft coupling 17 such as the Oldham's coupling. FIG. 12A is a perspective view of a state in which the torque sensor 14 is assembled. FIG. 12B is a side view of the state in which the torque sensor 14 is assembled, and FIG. 12C is a cross-sectional view thereof.

As described with reference to FIG. 2, the torque sensor 14 is coupled to the mount part 21 through the shaft coupling 17 such as the Oldham's coupling. The mount part 21 corresponding to the output shaft is a part separated from the torque sensor 14 and is arranged in a position offset from the end face of the actuator device 10 in the direction of the output shaft. The mount part 21 as the output shaft is driven on an outer side of the bearing 16 such as the cross roller bearing. A site of the flexure element of the torque sensor 14 and the strain gauge bonded thereto are nested inside the mount part 21 and it may also be said that the mount part 21 serves as a protection cover of the strain gauge. As is understood from assembly diagrams illustrated in FIGS. 12A to 12C, the torque sensor 14 offsets the output shaft through the separated part and outputs driving torque on an outer ring side of the bearing 16. According to this, manufacture is simple, so that the manufacture is easy and an error in manufacture may be easily controlled.

By forming the multi-joint robot by using the above-described actuator devices 10 in a plurality of sites, it becomes possible to increase an operational range while making the robot compact. The range of motion of each joint increases, so that it is possible to reduce the occupied space at the time of storage and decrease collision possibility when this is moved or transported, thereby contributing to improve safety.

When the output of the same actuators is required, it is possible to make the entire length of the multi-joint robot short by forming the same by using the above-described actuator devices 10 in a plurality of sites, so that it is possible to contribute to increase in weight capacity.

The above-described actuator device 10 has the both ends in the shape approximated to the spherical surface and the concave portion in the vicinity of the center thereof, so that the exterior thereof may be easily formed into a rotating body shape. Therefore, when the robot arm is rotated, it is possible to prevent user's hand and finger, a cable, and surrounding objects from getting caught therein, thereby contributing to improve safety.

The above-described actuator device 10 is configured with high spatial efficiency, so that it is possible to use a cheap magnet with low holding force (for example, a ferrite magnet) in place of a magnet with high holding force (for example, a neodymium magnet) and make the magnet larger correspondingly to obtain equivalent holding force, thereby contributing to realize a lower cost.

Figure 15:
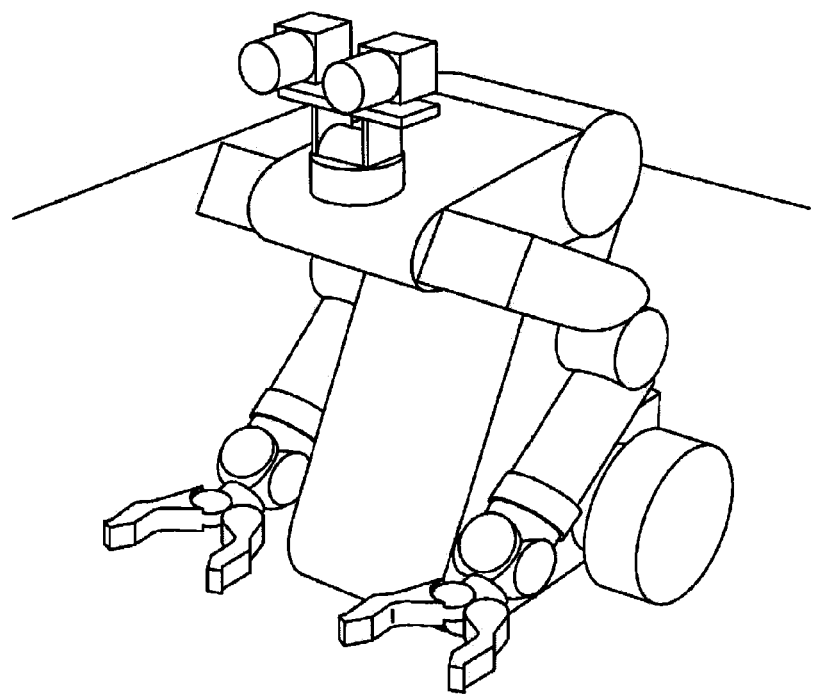
FIG. 15 is a view illustrating an appearance of a robot device 100 to which the actuator device 10 may be applied.
Figure 16:
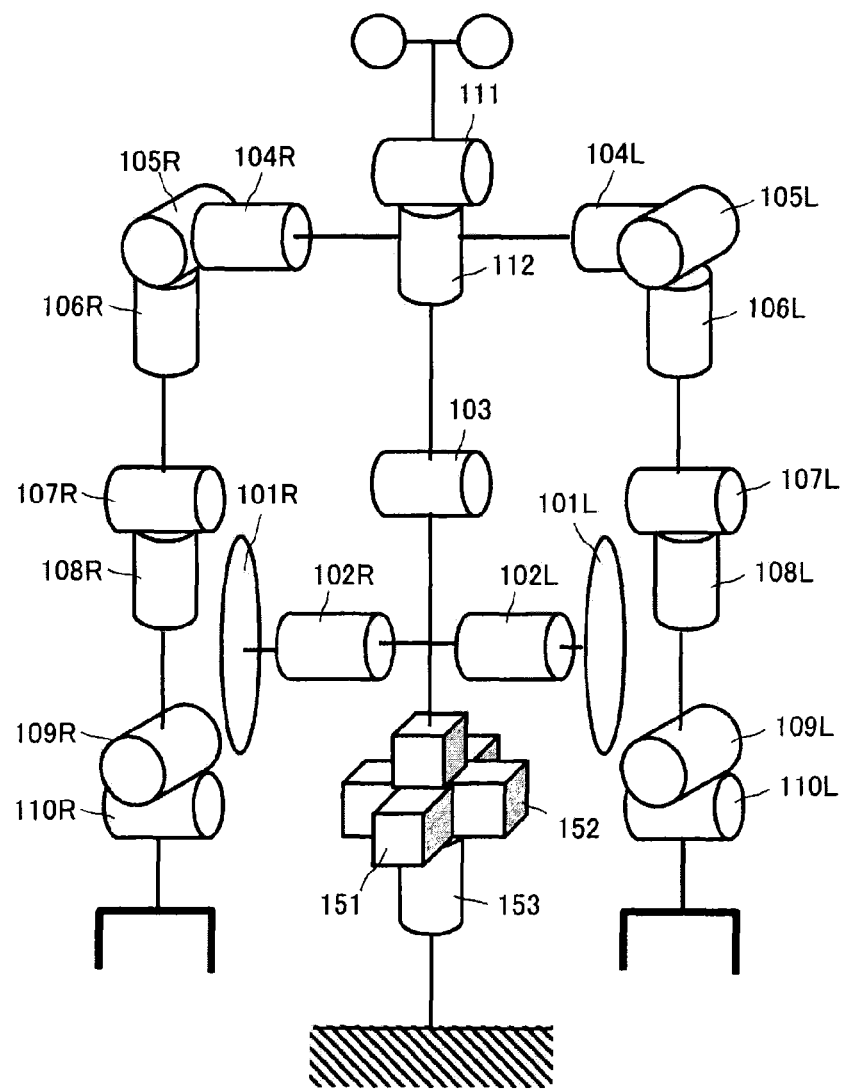
FIG. 16 is a view schematically illustrating a degree-of-freedom configuration of a joint of the robot device 100 illustrated in FIG. 15.

FIG. 15 illustrates an appearance of a robot device 100 to which the actuator device 10 may be applied. The illustrated robot device 100 is mainly placed in a home environment for providing housework, nursing care and the like; however, this may also be used for various purposes such as industrial purposes. FIG. 16 schematically illustrates a degree-of-freedom configuration of a joint of the robot device 100.

The illustrated robot device 100 is provided with two drive wheels 101R and 101L opposed to each other on a base portion as moving means. The drive wheels 101R and 101L are driven by drive wheel actuators 102R and 102L, which rotate about a pitch axis, respectively. Meanwhile, in FIG. 16, reference numerals 151, 152, and 153 represent non-existent underactuated joints corresponding to a translational degree of freedom in an X direction (front-rear direction), a translational degree of freedom in a Y direction (right-left direction), and a rotational degree of freedom about a yaw axis, respectively, of the robot device 100 relative to a floor surface for representing that the robot device 100 moves around a virtual world.

The moving means is connected to an upper body through a hip joint. The hip joint is driven by a hip joint pitch axis actuator 103, which rotates about the pitch axis. The upper body is formed of right and left two arms and a head connected through a neck joint. Each of the right and left arms has a total of seven degrees of freedom including three degrees of freedom at a shoulder joint, two degrees of freedom at an elbow joint, and two degrees of freedom at a wrist joint. The three degrees of freedom at the shoulder joint are driven by a shoulder joint pitch axis actuator 104R/L, a shoulder joint roll axis actuator 105R/L, and a shoulder joint yaw axis actuator 106R/L. The two degrees of freedom at the elbow joint are driven by an elbow joint pitch axis actuator 107R/L and an elbow joint yaw axis actuator 108R/L. The two degrees of freedom at the wrist joint are driven by a wrist joint roll axis actuator 109R/L and a wrist joint pitch axis actuator 110R/L. Two degrees of freedom at the neck joint are driven by a neck joint pitch axis actuator 111R/L and a neck joint yaw axis actuator 112R/L. One degree of freedom at a hand joint is driven by a hand joint roll axis actuator 113R/L.

As is understood from FIG. 16, the robot device 100 is a link structural body obtained by connecting a plurality of links by joints in which each joint is moved by the actuator and the above-described actuator device 10 may be applied to at least a part thereof. For example, when the actuator device 10 is applied to a joint site formed of two or more orthogonal degrees of freedom, one joint actuator may be preferably coupled to the output shaft of the other joint actuator. In FIG. 16, it is possible to obtain an effect that the substantial occupied space of the actuator device 10 on the subsequent stage is made small and the entire length of the multi-shaft driving mechanism is made short as illustrated in FIG. 8A by applying the actuator device 10 to each of the actuators 104, 105, and 106 at the shoulder joint formed of orthogonal three degrees of freedom of roll, pitch, and yaw, each of the actuators 107 and 108 at the elbow joint formed of orthogonal two degrees of freedom of pitch and yaw, each of the actuators 109 and 110 at the wrist joint formed of orthogonal two degrees of freedom of roll and pitch, and the actuators 111 and 112 of the neck joint formed of orthogonal two degrees of freedom of pitch and yaw. It is also possible to obtain an effect that the diameter of the exterior covering the multi-shaft driving mechanism may be made small and the interference range at the time when the elbow is bent may be made small to increase the range of motion of the elbow joint as illustrated in FIG. 14 by applying the actuator device 10 to each of the actuators 107 and 108 at the elbow joint formed of the orthogonal two degrees of freedom of pitch and yaw.

Figure 17:
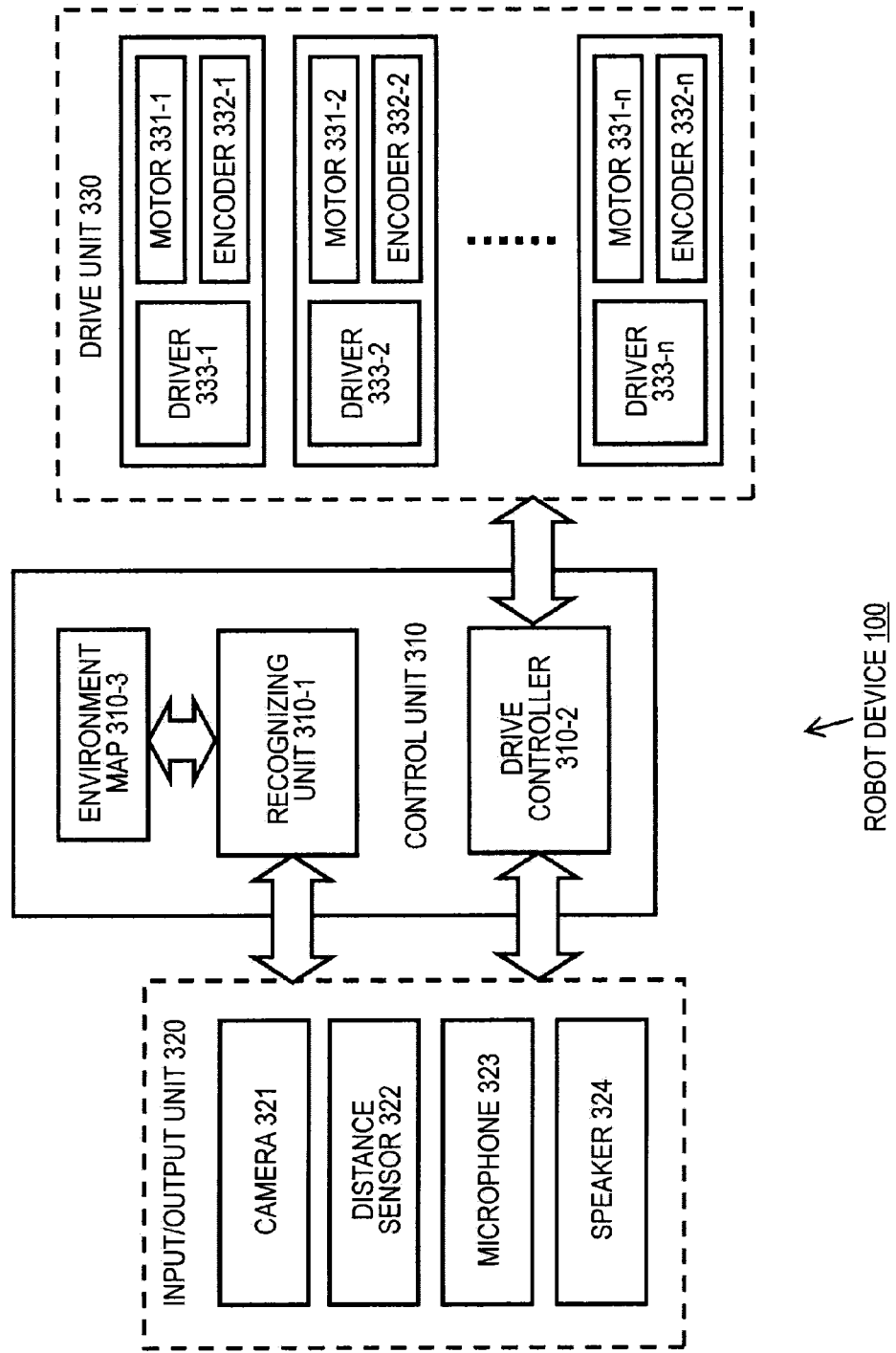
FIG. 17 is a view schematically illustrating a functional configuration of the robot device 100 illustrated in FIG. 15.

FIG. 17 schematically illustrates a functional configuration of the robot device 100. The robot device 100 is provided with a control unit 310, which generally controls entire motion and performs other data processing, an input/output unit 320, and a drive unit 330. Each unit is hereinafter described.

The input/output unit 320 is provided with a camera 321 corresponding to an eye of the robot device 100, a distance sensor 322, which detects a distance to a human or an obstacle, a microphone 323 corresponding to an ear of the robot device 100 and the like as an input unit. The robot device 100 may receive an instruction of a task by audio input of the user from the microphone 323, for example. The robot device 100 may also be provided with another input means (not illustrated) of the instruction of the task by wire, by air, or through a recording medium. The input/output unit 320 is provided with a speaker 324 corresponding to a mouth of the robot device 100 and the like as an output unit. The distance sensor 322 is formed of a space sensor such as a laser range finder, for example.

The drive unit 330 is a functional module for realizing the degree of freedom at each joint of the robot device 100 and is formed of a plurality of driving units provided for each of a roll axis, the pitch axis, and the yaw axis at each joint. Each driving unit is formed of combination of a motor 331, which performs rotational operation about a predetermined axis, an encoder 332, which detects a rotational position of the motor 331, and a driver 333, which adaptively controls the rotational position and a rotational speed of the motor 351 based on an output of the encoder 332. At least a part of the driving units is formed of the above-described actuator device 10. For example, when the actuator device 10 is applied in the joint site formed of the two or more orthogonal degrees of freedom, one joint actuator may be preferably coupled to the output shaft of the other joint actuator (as described above).

The control unit 310 is provided with a recognizing unit 310-1, a drive controller 310-2, and an environment map 310-3.

The recognizing unit 310-1 recognizes a surrounding environment based on information obtained from the input unit such as the camera 321 and the distance sensor 322 of the input/output unit 320. For example, the recognizing unit 310-1 constructs the environment map 310-3 in advance based on input information.

The drive controller 310-2 controls drive of the output unit of the input/output unit 320 and the drive unit 330. For example, the drive controller 310-2 controls the drive unit 330 for the robot device 100 to realize the instructed task such as the housework and the nursing care. The drive controller 310-2 also compares an outer environment recognized by the recognizing unit 310-1 with the environment map 310-3 to perform behavior control of the robot device 100, that is to say, motion control of each driving unit (actuator device 10).

Meanwhile, the technology disclosed in the present specification may also have a following configuration.

(1) An actuator device, including: a motor; a reducer, which reduces an output of the motor; a torque sensor driven by an outer ring relative to a stationary part of the motor to measure output torque from the reducer; and an output shaft frame attachment portion arranged in a position offset from an end of the torque sensor.

(2) The actuator device according to (1) described above, wherein the end of the torque sensor has a shape approximated to a spherical surface.

(3) The actuator device according to (1) or (2) described above, wherein the output shaft frame attachment portion is arranged on an outer peripheral portion of the torque sensor.

(4) The actuator device according to any of (1) to (3) described above, further including: a rotary encoder on a side opposite to the reducer of the motor.

(5) The actuator device according to (4) described above, wherein an end of the rotary encoder has a shape approximated to a spherical surface.

(6) The actuator device according to any of (1) to (5) described above, having a concave portion in the vicinity of the center.

(7) The actuator device according to any of (1) to (6) described above, wherein the torque sensor is a strain gauge type torsion torque sensor.

(8) A multi-shaft driving device, including: a first actuator on a preceding stage and a second actuator on a subsequent stage formed of same actuator devices, wherein each of the actuator devices has a shape approximated to a spherical surface on both ends and a concave portion in the vicinity of the center, and the first and second actuators are coupled such that the shape approximated to the spherical surface of an end on an output side of the first actuator abuts the concave portion in the vicinity of the center of the second actuator.

(9) The multi-shaft driving device according to (8) described above, wherein the actuator device is provided with a motor, a reducer, which reduces an output of the motor, a torque sensor having an end in a shape approximated to a spherical surface, which measures output torque from the reducer, and a rotary encoder having an end in a shape approximated to a spherical surface attached to a side opposite to the reducer of the motor.

(10) The multi-shaft driving device according to (9) described above, wherein the torque sensor is driven by an outer ring relative to a stationary part of the motor.

(11) The multi-shaft driving device according to (10) described above, wherein the torque sensor is a strain gauge type torsion torque sensor.

(12) The multi-shaft driving device according to (9) described above, wherein the second actuator includes an output shaft frame attachment portion arranged in a position offset from the end of the torque sensor, the multi-shaft driving device further including: an output shaft frame attached to the output shaft frame attachment portion.

(13) The multi-shaft driving device according to (12) described above, wherein the output shaft frame attachment portion is arranged on an outer peripheral portion of the torque sensor.

(14) The multi-shaft driving device according to any of (8) to (13) described above, further including: an exterior having a diameter corresponding to an occupied space of the second actuator at a time when the first actuator is driven.

(15) A robot device, including: a plurality of links and a plurality of joints connecting the links; a plurality of drive units, which drive the plurality of joints; and a controller, which controls the plurality of drive units, wherein at least a part of the plurality of drive units is formed of an actuator device provided with a motor, a reducer, which reduces an output of the motor, a torque sensor driven by an outer ring relative to a stationary part of the motor to measure output torque from the reducer, and an output shaft frame attachment portion arranged in a position offset from an end of the torque sensor.

(16) A robot device, including: a plurality of links and a plurality of joints connecting the links; a plurality of drive units, which drive the plurality of joints; and a controller, which controls the plurality of drive units, wherein at least a part of the drive units, which drive a joint site formed of orthogonal two degrees of freedom, is driven by a first actuator on a preceding stage and a second actuator on a subsequent stage formed of same actuator devices, each of the actuator devices has a shape approximated to a spherical surface on both ends and a concave portion in the vicinity of the center, and the first and second actuators are coupled such that the shape approximated to the spherical surface of an end on an output side of the first actuator abuts the concave portion in the vicinity of the center of the second actuator.

(17) The robot device according to (15) or (16) described above, further including: a moving unit, which moves the robot device.

(18) The robot device according to (15) or (16) described above, further including: a recognizing unit, which recognizes an outer environment, wherein the controller controls the plurality of drive units based on a recognition result by the recognizing unit.

INDUSTRIAL APPLICABILITY

The technology disclosed in the present specification is described above in detail with reference to a specific embodiment. However, it is obvious that one skilled in the art may modify or replace the embodiment without departing from the scope of the technology disclosed in the present specification.

Although the actuator device disclosed in the present specification may be used in a plurality of sites of the multi-shaft driving mechanism such as a multi-shaft manipulator, a service robot, a nursing-care or assistance robot, an electric reacher (arm robot for wheel-chair), a surgical robot, a space remote control robot, a rescue robot, a leg-type robot, a humanoid, and a snake-shaped robot, it goes without saying that it is possible to use the same in only one site. The actuator device disclosed in the present specification may also be applied to the multi-shaft driving mechanism other than the above-described one and a driving device other than the multi-shaft driving mechanism.

In short, the present technology is disclosed in a form of an example and the contents of the present specification should not be interpreted in a limited manner. In order to determine the scope of the present technology, claims should be taken into consideration.

REFERENCE SIGNS LIST 10 actuator device
11 motor
12 reducer
13 rotary encoder
14 torque sensor
15 motor driver board
16 bearing
17 shaft coupling
19 stationary part case
20 output shaft frame
21 mount part
100 robot device
101 drive wheel
102 drive wheel actuator
103 hip joint pitch axis actuator
104 shoulder joint pitch axis actuator
105 shoulder joint roll axis actuator
106 shoulder joint yaw axis actuator
107 elbow joint pitch axis actuator
108 elbow joint yaw axis actuator
109 wrist joint roll axis actuator
110 neck joint pitch axis actuator
111 neck joint pitch axis actuator
113 hand joint roll axis actuator
151, 152, 153 underactuated joint

The invention claimed is:
1. An actuator device, comprising:
a motor;
a reducer, which reduces an output of the motor;
a torque sensor driven relative to a stationary part of the motor to measure output torque from the reducer, the torque sensor having a first end surface facing in a direction away from the motor, and having a second end surface facing in a direction towards the motor; and
an output shaft frame attached to an outer peripheral portion of the torque sensor, the output shaft frame having a first end surface facing in a direction away from the motor, and having a second end surface facing in a direction towards the motor,
wherein the output shaft frame is arranged in a position offset from an end of the torque sensor in a direction of the stationary part of the motor such that the first end surface of the torque sensor is a first distance from the motor and the first end surface of the output shaft frame is a second distance from the motor, wherein the first distance is greater than the second distance.

2. The actuator device according to claim 1, wherein the end of the torque sensor has a shape approximated to a spherical surface.

3. The actuator device according to claim 1, wherein the output shaft frame attachment portion is arranged on an outer peripheral portion of the torque sensor.

4. The actuator device according to claim 1, further comprising:
a rotary encoder on a side opposite to the reducer of the motor.

5. The actuator device according to claim 4, wherein an end of the rotary encoder has a shape approximated to a spherical surface.

6. The actuator device according to claim 1, having a concave portion in the vicinity of the center.

7. The actuator device according to claim 1 wherein the torque sensor is a strain gauge type torsion torque sensor.

8. A surgical robot comprising:
the actuator device according to claim 1.

9. A multi-shaft driving device, comprising:
a first actuator on a preceding stage and a second actuator on a subsequent stage formed of same actuator devices, wherein
each of the actuator devices has a shape approximated to a spherical surface on both ends and a concave portion in the vicinity of the center, and
the first and second actuators are coupled such that the shape approximated to spherical surface of an end on an output side of the first actuator abuts the concave portion in the vicinity of the center of the second actuator,
wherein each of the actuator devices includes a motor, a reducer, which reduces an output of the motor, a torque sensor, and an output shaft frame,
wherein the torque sensor is driven relative to a stationary part of the motor to measure output torque from the reducer, the torque sensor has a first end surface facing in a direction away from the motor and has a second end surface facing in a direction towards the motor,
wherein the output shaft frame is attached to an outer peripheral portion of the torque sensor, the output shaft frame having a first end surface facing in a direction away from the motor, and having a second end surface facing in a direction towards the motor, and
wherein the output shaft frame is arranged in a position offset from an end of the torque sensor in a direction of the stationary part of the motor such that the first end surface of the torque sensor is a first distance from the motor and the first end surface of the output shaft frame is a second distance from the motor, wherein the first distance is greater than the second distance.

10. The multi-shaft driving device according to claim 9, further comprising a rotary encoder having an end in a shape approximated to a spherical surface attached to a side opposite to the reducer of the motor,
wherein the first end of the torque sensor has a shape approximated to a spherical surface.

11. The multi-shaft driving device according to claim 9, wherein
the torque sensor is a strain gauge type torsion torque sensor.

12. The multi-shaft driving device according to claim 9, further comprising:
an exterior of the first actuator having a diameter corresponding to an occupied space of the second actuator at a time when the first actuator is driven.

13. A robot device, comprising:
a plurality of links and a plurality of joints connecting the links;
a plurality of drive units, which drive the plurality of joints; and
a controller, which controls the plurality of drive units,
wherein at least a part of the plurality of drive units is formed of an actuator device provided with a motor, a reducer, which reduces an output of the motor, a torque sensor driven relative to a stationary part of the motor to measure output torque from the reducer, the torque sensor having a first end surface facing in a direction away from the motor, and having a second end surface facing in a direction towards the motor, and an output shaft frame, the output shaft frame attached to an outer peripheral portion of the torque sensor, the output shaft frame having a first end surface facing in a direction away from the motor, and having a second end surface facing in a direction towards the motor,
wherein the output shaft frame is arranged in a position offset from an end of the torque sensor in a direction of the stationary part of the motor such that the first end surface of the torque sensor is a first distance from the motor and the first end surface of the output shaft frame is a second distance from the motor, wherein the first distance is greater than the second distance.

14. The robot device according to claim 13, further comprising:
a moving unit, which moves the robot device.

15. The robot device according to claim 13, further comprising:
a recognizing unit, which recognizes an outer environment, wherein
the controller controls the plurality of drive units based on a recognition result by the recognizing unit.

16. A robot device, comprising:
a plurality of links and a plurality of joints connecting the links;
a plurality of drive units, which drive the plurality of joints; and a controller, which controls the plurality of drive units, wherein
at least a part of the drive units, which drive a joint site formed of orthogonal two degrees of freedom, is driven by a first actuator on a preceding stage and a second actuator on a subsequent stage formed of same actuator devices,
each of the actuator devices has a shape approximated to a spherical surface on both ends and a concave portion in the vicinity of the center, and
the first and second actuators are coupled such that the shape approximated to the spherical surface of an end on an output side of the first actuator abuts the concave portion in the vicinity of the center of the second actuator,
wherein each of the actuator devices includes a motor, a reducer, which reduces an output of the motor, a torque sensor, and an output shaft frame,
wherein the torque sensor is driven relative to a stationary part of the motor to measure output torque from the reducer, the torque sensor has a first end surface facing in a direction away from the motor and has a second end surface facing in a direction towards the motor,
wherein the output shaft frame is attached to an outer peripheral portion of the torque sensor, the output shaft frame having a first end surface facing in a direction away from the motor, and having a second end surface facing in a direction towards the motor, and
wherein the output shaft frame is arranged in a position offset from an end of the torque sensor in a direction of the stationary part of the motor such that the first end surface of the torque sensor is a first distance from the motor and the first end surface of the output shaft frame is a second distance from the motor, wherein the first distance is greater than the second distance.

* * * * *